United States Patent
Dong et al.

(10) Patent No.: US 10,885,178 B2
(45) Date of Patent: Jan. 5, 2021

(54) METHODS AND DEVICES FOR GENERATING SECURITY QUESTIONS AND VERIFYING IDENTITIES

(71) Applicant: Advanced New Technologies Co., Ltd., Grand Cayman (KY)

(72) Inventors: Liyun Dong, Hangzhou (CN); Na Sun, Hangzhou (CN); Xuan Jiang, Hangzhou (CN); Shumin Lin, Hangzhou (CN); Yuanshen Li, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/422,689

(22) Filed: May 24, 2019

(65) Prior Publication Data

US 2019/0281048 A1 Sep. 12, 2019

Related U.S. Application Data

(63) Continuation of application No. PCT/CN2017/111580, filed on Nov. 17, 2017.

(30) Foreign Application Priority Data

Nov. 24, 2016 (CN) .......................... 2016 1 1053422

(51) Int. Cl.
*H04W 12/06* (2009.01)
*G06F 21/36* (2013.01)
(Continued)

(52) U.S. Cl.
CPC ............ *G06F 21/36* (2013.01); *G06F 16/535* (2019.01); *G06F 16/55* (2019.01);
(Continued)

(58) Field of Classification Search
None
See application file for complete search history.

(56) References Cited

U.S. PATENT DOCUMENTS

| 5,608,387 | A | 3/1997 | Davies |
| 7,953,983 | B2 * | 5/2011 | Holt ........................ G06F 21/36 |
| | | | 713/186 |

(Continued)

FOREIGN PATENT DOCUMENTS

| CN | 1820288 | 8/2006 |
| CN | 104468101 | 3/2015 |

(Continued)

OTHER PUBLICATIONS

International Preliminary Report on Patentability in International Application No. PCT/CN2017/111580, dated May 28, 2019, 11 pages (with English Translation).

(Continued)

*Primary Examiner* — Fatoumata Traore
(74) *Attorney, Agent, or Firm* — Fish & Richardson P.C.

(57) ABSTRACT

A security question generation instruction is sent by a server to a user device. A reference picture is received at the server from the user device, where the reference picture is generated by the user device based on the security question generation instruction. A number of confusion pictures corresponding to the reference picture are determined by the server. A security question is generated by the server based on the reference picture and the plurality of confusion pictures.

15 Claims, 16 Drawing Sheets

(51) Int. Cl.
  *G06F 16/55* (2019.01)
  *G06F 16/9032* (2019.01)
  *G06F 16/535* (2019.01)
  *H04L 29/06* (2006.01)
  *G06F 21/46* (2013.01)

(52) U.S. Cl.
  CPC ........ *G06F 16/90332* (2019.01); *G06F 21/46* (2013.01); *H04L 63/08* (2013.01); *H04L 63/0853* (2013.01)

(56) References Cited

U.S. PATENT DOCUMENTS

| | | | |
|---|---|---|---|
| 8,521,675 B2* | 8/2013 | Boyle | G06F 17/289 706/45 |
| 2004/0093527 A1 | 5/2004 | Pering et al. | |
| 2007/0094717 A1* | 4/2007 | Srinivasan | G06F 21/36 726/5 |
| 2008/0052245 A1* | 2/2008 | Love | G06F 21/36 705/76 |
| 2010/0186083 A1 | 7/2010 | Shinzaki et al. | |
| 2011/0154482 A1* | 6/2011 | Heiner | G06F 21/36 726/19 |
| 2012/0106805 A1* | 5/2012 | Shuster | G06K 9/00912 382/115 |
| 2012/0154609 A1* | 6/2012 | Ozaki | H04N 5/765 348/207.99 |
| 2014/0244494 A1 | 8/2014 | Davis et al. | |
| 2014/0250510 A1 | 9/2014 | Shuster | |
| 2015/0125049 A1* | 5/2015 | Taigman | G06K 9/00268 382/118 |
| 2015/0371079 A1* | 12/2015 | Kohlenberg | G06F 21/31 348/77 |
| 2016/0239676 A1 | 8/2016 | Zhai | |
| 2016/0275304 A1 | 9/2016 | Jiang et al. | |

FOREIGN PATENT DOCUMENTS

| | | |
|---|---|---|
| CN | 105357008 | 2/2016 |
| CN | 105426744 | 3/2016 |
| CN | 105678127 A | 6/2016 |
| CN | 105981036 | 9/2016 |
| CN | 106161020 A | 11/2016 |
| CN | 106161030 A | 11/2016 |
| CN | 107026842 A | 8/2017 |
| JP | 2010204733 | 9/2010 |
| JP | 2013047865 | 3/2013 |
| JP | 201645920 | 4/2016 |
| TW | 201129049 | 8/2011 |
| WO | WO 2010113327 | 10/2010 |
| WO | WO 2011113326 | 9/2011 |
| WO | WO-2016022501 A2 * | 2/2016 ........... G06F 21/606 |

OTHER PUBLICATIONS

Supplementary Partial European Search Report in European Application No. 17874065.0, dated Oct. 4, 2019, 13 pages.
PCT International Search Report and Written Opinion issued in International Application No. PCT/CN2017/111580 dated Feb. 9, 2018, 15 pages (with English translation).
Wikipedia.org [online], "Authentication," Wikipedia reference, available on or before Mar. 29, 2015, via Internet Archive: Wayback Machine URL <https://web.archive.org/web/20150701000000*/https://zh.wikipedia.org/Mme>, retrieved on Aug. 7, 2019, URL<https://zh.wikipedia.org/wiki/Mme>, 4 pages (Machine-translation).
Extended European Search Report in European Application No. 17874065.0, dated Jan. 30, 2020, 14 pages.
Crosby et al., "BlockChain Tchnology: Beyond Bitcoin," Sutardia Center for Entrepreneurship & Technology Technical Report, 2015, 35 pages.
PCT International Search Report and Written Opinion issued in International Application No. PCT/CN2017/111580 dated Feb. 9, 2015, 15 pages (with English translation).
Wikipedia.org [online], "Authentication," Wikipedia reference, available on or before Mar. 29, 2019, via Internet Archive: Wayback Machine URL <https://web.archive.org/web/20150701000000*/https://zh.wikipedia.org/身份验证>, retrieved on Aug. 7, 2019, URL <https://zh.wikipedia.org/wiki/身份验证>, 4 pages (Machine-translation).

* cited by examiner

METHODS AND DEVICES FOR GENERATING SECURITY QUESTIONS AND VERIFYING IDENTITIES

CROSS-REFERENCE TO RELATED APPLICATIONS

This application is a continuation of PCT Application No. PCT/CN2017/111580, filed on Nov. 17, 2017, which claims priority to Chinese Patent Application No. 201611053422.0, filed on Nov. 24, 2016, and each application is hereby incorporated by reference in its entirety.

TECHNICAL FIELD

The present application relates to the field of information technologies, and in particular, to a method and a device for generating security questions and verifying identities.

BACKGROUND

With development of information technologies, because a service is executed at a high speed and only a few resources are consumed when the service is executed in a network, services are executed in the network increasingly. To ensure service execution security in the network, an identity of a service initiator usually needs to be verified. Therefore, how to perform identity verification more accurately, conveniently, and quickly becomes one of main concerns of people.

In existing identity verification methods, a user identity is mainly verified by using a security question. There can be two main types of security questions based on different generation methods: One type of security questions is generated by instructing a user to predetermine the security questions and answers. The other type of security questions is generated by collecting and analyzing historical behavior data of a user, and is used for identity verification.

For the security question generated in the first method, to ensure that the security question predetermined by the user is not easily cracked, when setting the security question, the user is usually instructed to set some infrequently used questions of fact content, for example, who is the primary school teacher of the user, when is the birthday date of a close relative of the user, and what is a favorite team name. Because the infrequently used questions of fact content have a low probability and frequency of occurrence in user's daily life, a probability that the security questions are cracked is low.

For the security question generated in the second method, because the security question is generated by collecting and analyzing the historical behavior data of the user, content of the question and an answer to the question have a close relationship with daily behavior of the user. For example, the security question is generated by using transaction information of the user, travel information of the user, and a friend relationship of the user. Behavior of each user has a unique personal characteristic, and the question can also involve a fact that is clear only to the user. Therefore, the user does not need to set the question, and the security question can hardly be cracked.

However, the existing technology still has the following disadvantages. For the security question generated in the first method, because the security question is a question that is infrequently used by the user, there is a relatively high requirement on memory of the user for a correct answer to the question. Although the security question can hardly be cracked, a probability that the user forgets the correct answer to the question increases, and usability of the security question is affected. For the security question generated in the second method, because the security question needs to be collected and analyzed based on the historical behavior data of the user, more historical behavior data of the user usually needs to be collected for analyzing and generating the security question. If the amount of historical behavior data of the user is relatively small or is zero, it is difficult to generate the security question. Therefore, for the security question generated in the second method, there are requirements on both the amount and quality of historical behavior data of the user. Consequently, it is more difficult to generate the security question by using the method and promote the method for generating the security question (in other words, it is difficult to expand the application scope of the method).

It can be seen that, in the existing identity verification methods, because the methods for generating the security questions have the previously described disadvantages, usability of the security question used for identity verification is low, a generation requirement is high, and running costs are high, causing low identity verification efficiency.

SUMMARY

Implementations of the present application provide a method and a device for generating security questions, to reduce problems of high identity verification costs and low identity verification efficiency that are caused by low usability and a high generation requirement of an existing security question used for identity verification.

Implementations of the present application provide a method and a device for verifying identities, to reduce problems of high identity verification costs and low identity verification efficiency that are caused by low usability and a high generation requirement of an existing security question used for identity verification.

Implementations of the present application provide a method and a device for managing security questions, to reduce problems of high identity verification costs and low identity verification efficiency that are caused by low usability and a high generation requirement of an existing security question used for identity verification.

The following technical solutions are used in the implementations of the present application.

A method for generating security questions includes the following: sending a security question generation instruction to a user device, and receiving a reference picture generated and returned by the user device based on the generation instruction; determining several confusion pictures corresponding to the reference picture; and generating a security question based on the reference picture and the confusion pictures.

A method for generating security questions includes the following: receiving a security question generation instruction sent by a server; detecting an operation of a user, and generating a reference picture based on the detected operation; and returning the reference picture to the server, so that the server generates a security question based on the reference picture.

A method for verifying identities includes the following: determining, based on a to-be-verified account, a reference picture used to generate a security question corresponding to the to-be-verified account; generating the security question based on the reference picture and confusion pictures corresponding to the reference picture; sending the security question to a user device that the to-be-verified account is logged in; and receiving a selection result returned by the user device, and performing identity verification on the to-be-verified account based on the selection result.

A method for managing security questions includes the following: determining each security question corresponding to an account; determining a generation time and a usage record that correspond to each security question; determining at least one of a validity period, a priority, and a cooldown period that correspond to each security question based on the generation time and the usage record that correspond to each security question; and when identity verification is being performed on the account, selecting, based on the at least one of the validity period, the cooldown period, and the priority that correspond to each security question, a security question used for identity verification from the security questions corresponding to the account, and performing identity verification on the account by using the selected security question.

A device for generating security questions includes the following: a communications module, configured to send a security question generation instruction to a user device, and receive a reference picture generated and returned by the user device based on the generation instruction; a determining module, configured to determine several confusion pictures corresponding to the reference picture; and a generation module, configured to generate a security question based on the reference picture and the confusion pictures.

A device for generating security questions includes the following: a receiving module, configured to receive a security question generation instruction sent by a server; a detection and generation module, configured to detect an operation of a user, and generate a reference picture based on the detected operation; and a sending and generation module, configured to return the reference picture to the server, so that the server generates a security question based on the reference picture.

A device for verifying identities includes the following: a determining module, configured to determine, based on a to-be-verified account, a reference picture used to generate a security question corresponding to the to-be-verified account; a generation module, configured to generate the security question based on the reference picture and confusion pictures corresponding to the reference picture; a sending module, configured to send the security question to a user device that the to-be-verified account is logged in; and a verification module, configured to receive a selection result returned by the user device, and perform identity verification on the to-be-verified account based on the selection result.

A device for managing security questions includes the following: a first determining module, configured to determine each security question corresponding to an account; a second determining module, configured to determine a generation time and a usage record that correspond to each security question; a third determining module, configured to determine at least one of a validity period, a priority, and a cooldown period that correspond to each security question based on the generation time and the usage record that correspond to each security question; and a verification and selection module, configured to: when performing identity verification on the account, select, based on the at least one of the validity period, the cooldown period, and the priority that correspond to each security question, a security question used for identity verification from the security questions corresponding to the account, to perform identity verification on the account.

The at least one previously described technical solution used in the implementations of the present application can achieve the following beneficial effects:

During generation of a security question, a security question generation instruction is first sent to a user device, so that the user device detects and returns a reference picture generated under an operation of a user. Then, several confusion pictures corresponding to the reference picture are determined based on the reference picture. Finally, a security question is generated based on the reference picture and the confusion pictures, and identity verification is performed by using the security question when necessary. It can be seen that because the security question is generated based on the reference picture, and the reference picture is generated under the operation of the user, the user is further involved in the security question generation, and can better remember the security question, and the security question is more usable. In addition, behavior data of the user does not need to be collected or analyzed, so that generation costs are reduced, and identity verification efficiency is improved.

BRIEF DESCRIPTION OF DRAWINGS

The accompanying drawings described here are intended to provide a further understanding of the present application, and constitute a part of the present application. The illustrative implementations of the present application and descriptions thereof are intended to describe the present application, and do not constitute limitations on the present application. In the accompanying drawings.

DESCRIPTION OF IMPLEMENTATIONS

To make the objectives, technical solutions, and advantages of the present application clearer, the following clearly and comprehensively describes the technical solutions of the present application with reference to specific implementations and accompanying drawings of the present application. Apparently, the described implementations are merely some rather than all of the implementations of the present application. All other implementations obtained by a person of ordinary skill in the art based on the implementations of the present application without creative efforts shall fall within the protection scope of the present application.

The technical solutions provided in the implementations of the present application are described in detail below with reference to the accompanying drawings.

Figure 1:
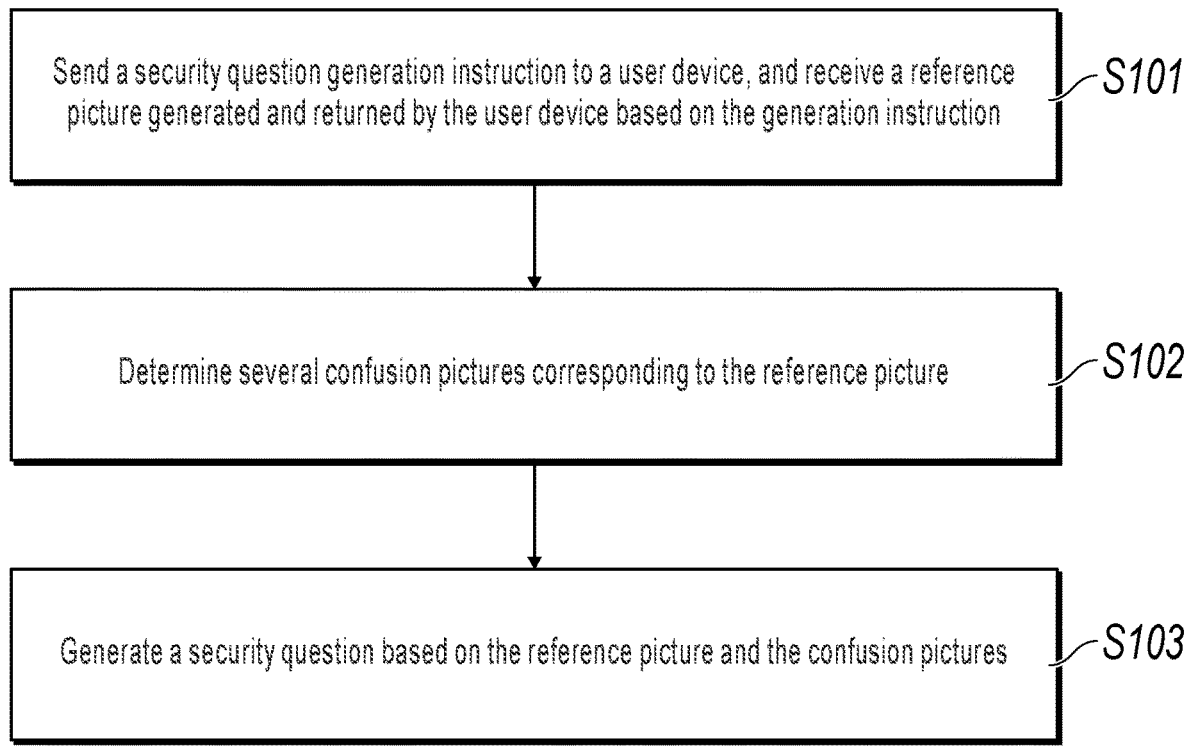
FIG. 1 illustrates a process of generating a security question, according to an implementation of the present application.

FIG. 1 illustrates a process of generating a security question, according to an implementation of the present application. The process includes the following steps.

S101: Send a security question generation instruction to a user device, and receive a reference picture generated and returned by the user device based on the generation instruction.

Because a security question needed for identity verification is used to verify an identity of a user using a service (or initiating a service request), how to generate a security question and what type of security questions is generated are usually determined by a service provider (in other words, they are not determined by the user). Therefore, generally, during generation of a security question, a server providing a service can send a security question generation instruction to a user device using the service (simply, the server sends the security question generation instruction to the user device), so that a user operating the user device can set a security question based on the generation instruction. As such, identity verification can be performed by using the security question when necessary. Likewise, in the present application, the server can send the security question generation instruction to the user device.

In addition, it is worthwhile to note that because a user usually needs to execute a service by using an account, different accounts can correspond to different users, and identity verification is performed on an identity of the user, the server can send the generation instruction to the user device by using the account.

The server can determine, by using a plurality of methods, an account that is logged in on a user device that the security question generation instruction is to be sent. For example, the server determines accounts that have been registered at a previous moment, and sends the security question generation instruction to user devices by using the accounts; or polls accounts that have been registered, determines an account without a security question, and sends the security question generation instruction to user devices by using the accounts. A method for initiating the security question generation instruction is not limited in the present application.

Further, like the existing technology, before sending the security question generation instruction, the server can determine that the account logged in on the user device has been verified in a current login validity period, to ensure validity of a security question generated subsequently. Certainly, a method for determining that the account logged in on the user device has been verified in the current login validity period is not limited in the present application. The server can perform identity verification on the account logged in on the user device based on an actual application demand, and continue to perform a subsequent operation when the identity verification on the account succeeds.

Still further, in this implementation of the present application, the generation instruction can be used by the user device to generate the reference picture and return the reference picture to the server. Certainly, the generation instruction can be further used by the user device to return an identifier of an account corresponding to the reference picture and the reference picture to the server, so that the server can determine the account. Therefore, the server can further receive the reference picture and the identifier of the account that are generated and returned by the user device based on the generation instruction.

Specifically, the generation instruction can include information such as a text, a picture, audio, and a video, and can be displayed on the user device to instruct a user using the user device to perform an operation, to generate the reference picture on the user device. The operation can include a gesture operation, a voice operation, etc. The operation can be determined based on an actual application demand, provided that the user device can generate the reference picture under the operation of the user. For example, the reference picture can be a picture drawn by the user through a gesture operation, a picture taken by the user by using a camera of the user device through a gesture operation, or a picture taken by the user device under a voice instruction of the user. In other words, the reference picture can be generated by using a plurality of methods.

It is worthwhile to note that, in this implementation of the present application, the user device can be a mobile phone, a tablet, or the like, and the server can be a standalone device, or can be a system including a plurality of devices, namely, a distributed server. Implementations are not limited in the present application.

S102: Determine several confusion pictures corresponding to the reference picture.

In this implementation of the present application, because the user device returns the reference picture in step S101, the server can determine the corresponding confusion pictures based on the reference picture, so that the security question can be generated subsequently based on the reference picture and the confusion pictures.

Because the process of generating the reference picture is completed with the help of the user, the user is usually most clear about features and details of the reference picture. Therefore, in the present application, the server can generate the security question by using the reference picture as a correct answer for the security question. In addition, during generation of the security question, a number of incorrect answers are further needed, and the incorrect answers are used as confusing options for the security question, to improve confidentiality of the security question. Therefore, the server can further determine confusion pictures similar to the reference picture, and use the confusion pictures as incorrect answers. In addition, the confusion pictures determined by the server and the reference picture cannot be too similar to be distinguished by the user generating the reference picture.

Therefore, in the present application, the server can first determine a feature value of the reference picture, so as to select proper confusion pictures based on the feature value.

Specifically, in this implementation of the present application, the server can determine the feature value of the reference picture based on a predetermined feature extraction model. There can be a plurality of feature extraction models, and the feature extraction model can include at least one of a color feature model, a graphics feature model, and a complexity feature model.

The color model can be a hue, saturation, value (HSV) model. By using the color model, a hue value, a saturation value, and a lightness value of each pixel of the reference picture can be determined. A matrix corresponding to the hue value of each pixel of the reference picture is used as a feature value of the reference picture, a matrix corresponding to the saturation value of each pixel of the reference picture is used as a feature value of the reference picture, and a matrix corresponding to the lightness value of each pixel of the reference picture is used as a feature value of the reference picture. The matrices can be a first-order color matrix, a second-order color matrix, and a third-order color matrix of the reference picture corresponding to a color matrix, and the color matrix can be used as a color feature value of the reference picture.

The shape feature model can be determining a shape feature value of the reference picture through calculation by using a boundary feature method, determining a shape feature value of the reference picture by using a Fourier shape descriptor, determining a shape feature value of the reference picture by using a matrix of any shape area as a shape description parameter based on an moment invariant method, etc.

The complexity feature model can be using, as a complexity feature value of the reference picture, frequency at which each grayscale occurs in the reference picture by using a grayscale histogram of the reference picture, using, as a complexity feature value of the reference picture, a texture feature value of the reference picture that is generated by using a gray-level co-occurrence matrix of a grayscale histogram of the reference picture, etc.

In other words, in the present application, a plurality of feature values of the reference picture can be determined by using any picture feature extraction model, method, etc. in the existing technology. Specifically, a picture feature extraction method that is the same as that in the existing technology can be used to determine the feature value of the reference picture, and the reference picture only needs to correspond to at least one feature value. In other words, a specific method for determining the feature value of the reference picture is not limited in the present application.

Further, after determining the feature value of the reference picture, the server can determine the confusion pictures corresponding to the reference picture based on the feature value.

As described above, the confusion pictures have the following function: A user different from the user generating the reference picture by using the user device has a low probability of selecting the reference picture for the security question generated subsequently. Therefore, the confusion pictures can have similar feature values to the reference picture, so as to be confusing. On the other hand, if the confusion pictures are too similar to the reference picture (in other words, the feature values are too similar), a probability that the user generating the reference picture by using the user device cannot distinguish between the reference picture and the confusion pictures is also increased. Therefore, in the present application, there can be a certain difference between the feature values of the confusion pictures and the feature value of the reference picture.

Specifically, after determining the feature value of the reference picture, the server can determine a value range corresponding to the reference picture based on a preconfigured value setting policy, determine, from a stored to-be-selected picture pool based on the value range, to-be-selected pictures whose feature values fall within the value range, and use the to-be-selected pictures as the confusion pictures corresponding to the reference picture. The to-be-selected picture pool includes to-be-selected pictures.

Step 1: When the server determines the value range corresponding to the reference picture, to prevent the determined confusion pictures from being too similar or too different from the reference picture, a difference between a maximum value of the value range determined by the server and the feature value of the reference picture is not greater than a predetermined maximum value, a difference between a minimum value of the determined value range and the feature value of the reference picture is not less than a predetermined minimum value, and the determined feature value does not fall within the value range. In other words, the value range corresponding to the feature value is determined by using the feature value as a reference, so that the value range is neither too close to the feature value nor too far from the feature value. It is worthwhile to note that a specific method for determining the value setting policy is not limited in the present application. For example, the value setting policy is determined based on experience or is determined by using a machine learning method.

Further, the server can use different value setting policies for different feature values. Therefore, the value setting policy stored on the server can vary with the feature value, as shown in Table 1.

TABLE 1

| Feature value identifier | Feature value range | Value setting policy |
| --- | --- | --- |
| Feature value A | 0 to 100 | ±12 to 15 |
| Feature value B | 0 to 255 | +90 to 150 |
| Feature value C | −10 to 150 | ±110 to 120 |

The feature value range indicates a maximum value and a minimum value of the feature value (for example, in an RGB color space, a value range of each color is 0 to 255, in other words, a maximum value can be 255, and a minimum value can be 0). The value setting policy indicates a corresponding value range obtained by using the feature value as a reference. It is worthwhile to note that, the symbol "±" shown in Table 1 indicates that the value range corresponding to the feature value is an increment and a decrement, the symbol "+" indicates that the value range corresponding to the feature value is an increment, and the symbol "−" indicates that the value range corresponding to the feature value is a decrement.

For example, if it is determined for reference picture X that feature value A is 35, feature value B is 20, and feature value C is 16, value ranges determined for reference picture X based on the value setting policies shown in Table 1 can be shown in Table 2.

TABLE 2

| Feature value identifier | Feature value (i.e. reference) | Value range |
| --- | --- | --- |
| Feature value A | 35 | 47 to 50 and 20 to 23 |
| Feature value B | 20 | 110 to 170 |
| Feature value C | 16 | 116 to 136 and does not exist |

It can be seen that there are two value ranges, namely, an increment and a decrement indicated by the symbol "±", corresponding to each of feature value A and feature value C, and a value range corresponding to feature value B is an increment. Therefore, feature value B corresponds to only one value range, namely, "110 to 170". In addition, because a feature value range of feature value C is "−10 to 150", in the present application, only one value range of an increment, namely, "116 to 136", corresponding to feature value C falls within the feature value range in the case of a value setting policy "±110 to 120", and a value range of a decrement falls beyond the feature value range of feature value C. In other words, "−104 to −94" falls beyond the feature value range "−10 to 150", and therefore does not exist.

Figure 2:
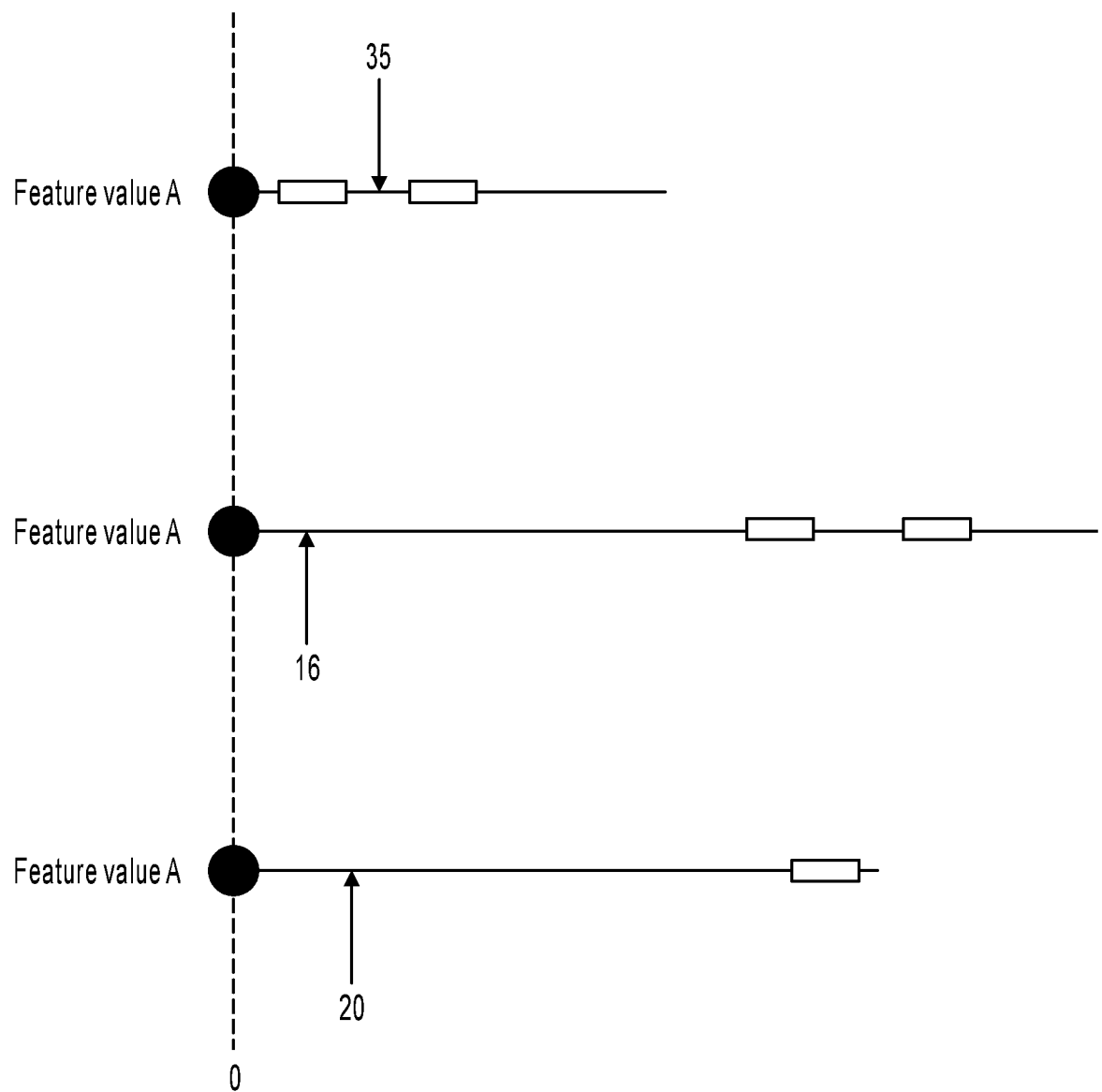
FIG. 2 is a schematic diagram illustrating value ranges of reference picture X, according to an implementation of the present application.

For ease of understanding, FIG. 2 is a schematic diagram of value ranges of reference picture X, according to an implementation of the present application. Feature values A, B, and C are indicated by three line segments, and end points of each of the three line segments indicate a maximum value and a minimum value of each of feature values A, B, and C. The feature values of reference picture X are indicated by points on the three line segments, and the value ranges of reference picture X are indicated by thick lines on the three line segments. It can be seen that the value ranges of reference picture X do not include the feature values of reference picture X.

Step 2: After determining the value range corresponding to the reference picture, the server can determine, from the stored to-be-selected picture pool based on the value range, the to-be-selected pictures whose feature values fall within the value range, and use the to-be-selected pictures as the confusion pictures corresponding to the reference picture.

Specifically, the server can prestore the to-be-selected picture pool including several to-be-selected pictures, so that the server can determine, from the to-be-selected picture pool based on the value range, the to-be-selected pictures whose feature values fall within the value range, and subsequently generate the security question. The to-be-selected pictures in the to-be-selected picture pool can be manually added by a staff member to the to-be-selected picture pool, or can be obtained by the server from various databases by using a network. A process of obtaining the to-be-selected pictures in the to-be-selected picture pool is not limited in the present application.

In addition, for each to-be-selected picture in the to-be-selected picture pool, whether the to-be-selected picture can be used as a confusion picture corresponding to the reference picture is determined based on whether a feature value of the to-be-selected picture falls within the value range of the reference picture. Therefore, to reduce a time for the server to determine the confusion pictures corresponding to the reference picture, the server can predetermine the feature value of the to-be-selected picture before storing the to-be-selected picture, and store the to-be-selected picture and the feature value of the to-be-selected picture (in other words, feature values of the to-be-selected pictures in the to-be-selected picture pool can be pre-determined). As such, when determining the confusion pictures corresponding to the reference picture, the server can determine, based on the stored feature values of the to-be-selected pictures, the to-be-selected pictures whose feature values fall within the value range of the reference picture, and use the to-be-selected pictures as the confusion pictures. Certainly, in the present application, the feature values of the to-be-selected pictures are not necessarily determined by using the described method, and a time and a method for determining the feature values of the to-be-selected pictures in the to-be-selected picture pool are not limited.

In addition, if the server determines that a feature value of no to-be-selected picture falls within the value range, the server can return error information, and send the generation instruction described in step S101 to the user device again until at least one confusion picture is determined.

S103: Generate a security question based on the reference picture and the confusion pictures.

In this implementation of the present application, after determining the reference picture and the confusion pictures corresponding to the reference picture, the server can generate the security question.

First, because the number of confusion pictures corresponding to the reference picture that are determined by the server in step S102 cannot be pre-determined, the server may determine many confusion pictures corresponding to the reference picture. During generation of the security question, if all the confusion pictures and the reference picture are used as answer options for the security question, there are too many options, and the user can hardly answer the security question (for example, if there are 50 answer options for the security question, much time is needed for the user to browse all the options, and it is even more difficult for the user to determine a correct answer from the 50 answer options). Therefore, in the present application, the server can first determine the specified number of confusion pictures from the confusion pictures corresponding to the reference picture. The specified number can be set by a staff member based on an actual application requirement, or determined based on the number of confusion pictures corresponding to the reference picture. A specific method for determining the specified number is not limited in the present application.

Next, the server can use the reference picture and the specified number of confusion pictures as answer options, to generate the security question. To be specific, the server uses the reference picture as a correct answer option, and uses the specified number of confusion pictures as incorrect answer options, to generate the security question in a form of single and multiple choice questions.

Further, as described in step S101, the security question can be used to perform identity verification on the account. Therefore, when generating the security question, the server can further generate an identifier of the security question, and store the security question, the identifier of the security question, and a correspondence between the security question and the identifier of the security question, so that when using the security question subsequently, the server can determine the security question based on the identifier of the security question, and use the security question (e.g., sending the security question to the to-be-verified account).

Still further, when storing the security question, the server can further store a correspondence between the reference picture and the confusion pictures. When determining that the security question needs to be used, the server determines the security question by using the stored reference picture and the stored correspondence between the reference picture and the confusion pictures. To be specific, in the present application, after the server generates the security question in step S103, because the security question does not necessarily need to be used immediately, when storing the security question, the server can store only a basis (namely, the reference picture and the correspondence between the reference picture and the confusion pictures) for generating the security question. When the security question needs to be used, the server obtains the security question based on the reference picture and the correspondence between the reference picture and the confusion pictures. A specific method used in practice is not limited in the present application, provided that the security question is a security question that the reference picture and the determined confusion pictures are used as answer options.

According to the method for generating security questions shown in FIG. 1, the server generates the security question based on the reference picture generated by the user by operating the user device. Because the reference picture can be generated anytime, a probability that other people can deliberately steal the reference picture is reduced. In addition, because only the user knows specific content of the reference picture, other people can hardly determine the specific content of the reference picture even if they know life habits and personal information of the user. Therefore, the reference picture is relatively secure. In addition, because the reference picture is generated under the operation of the user, the user is more involved in setting the security question. Therefore, the user knows the reference picture well, the user can better remember the reference picture, and a probability that the user forgets the reference picture is reduced. It can be seen that, according to the method provided in this implementation of the present application, a relatively secure security question that the user can easily remember can be generated. In addition, during generation of the security question, historical behavior data of the user does not need to be used. Therefore, usability of the security question is improved, running costs are reduced, and identity verification efficiency is improved.

In addition, in the present application, when the server determines the confusion pictures in step S102, for the reference picture generated by the user device in step S101, if more confusion pictures are determined by the server, answer options for the generated security question can be selected more flexibly (e.g., if there are three options for the security question, answer options respectively corresponding to two confusion pictures are needed in addition to an answer option corresponding to the reference picture. If only two confusion pictures corresponding to the reference picture are determined, answer options for the security question are fixed. If more than two confusion pictures are determined, there can be more choices for answer options for the security question. In other words, if there are more confusion pictures, answer options can be selected more flexibly during generation of the security question). In addition, if answer options for the security question are selected more flexibly, an occurrence probability of the same answer options is lower when the security question is repeatedly used, and the security question is more secure. Therefore, in step S102, the server can further determine whether to continue to perform a subsequent step based on the number of determined confusion pictures.

Specifically, the server can further preconfigure a threshold for the number of confusion pictures. When the number of confusion pictures corresponding to the reference picture that are determined by the server in step S102 is not less than the predetermined threshold for the number of confusion pictures, the server can determine to continue to perform a subsequent step S103. When the server determines that the number of confusion pictures corresponding to the reference picture is less than the predetermined threshold for the number of confusion pictures, the server can determine to perform step S101 to send the generation instruction to the user device again. The generation instruction can further include prompt information, for example, text information: "There are few options for the generated security question. Please draw/take a picture again".

Further, in the present application, the feature value of the reference picture that is determined in step S102 can be considered as a basis for performing the subsequent step S103, and picture quality of the reference picture determines a probability that the extracted feature value of the reference picture can uniquely indicate the reference picture (in other words, whether the feature value of the reference picture can accurately indicate the reference picture). If the picture quality of the reference picture is higher, the probability that the feature value of the reference picture uniquely indicates the reference picture is higher. If the picture quality of the reference picture is lower, a probability that the determined feature value of the reference picture can indicate a plurality of pictures is higher, but the probability that the feature value of the reference picture uniquely indicates the reference picture is lower. Consequently, a probability that there is a large difference between the confusion pictures determined subsequently and the reference picture is increased, and the confusion pictures are less able to be confused with the correct answer, reducing quality of the generated security question.

Therefore, in the present application, to ensure the quality of the security question generated subsequently, the server can determine whether the reference picture satisfies a predetermined condition before generating the security question. The condition includes at least one of the following: The number of pixels of the reference picture is not less than the predetermined number of pixels, storage occupation space of the reference picture is not smaller than predetermined storage occupation space, and a content category of the reference picture does not belong to a predetermined category.

Predetermined conditions for the number of pixels of the reference picture and the storage occupation space of the reference picture can ensure the picture quality of the reference picture, to be specific, ensure that the reference picture is sufficiently large and sufficiently clear, so that a relatively accurate feature value can be extracted. A predetermined condition for the content category of the reference picture can ensure, in terms of content of the reference picture, that the reference picture is not a picture including malicious information such as a pornographic picture, a politically sensitive picture, or an advertisement picture. The predetermined number of pixels, the predetermined storage occupation space, and the predetermined category can all be set by a staff member based on an actual application demand.

It is worthwhile to note that, in the present application, the content category of the reference picture helps prevent the reference picture from being malicious information by using a "blacklist" method. In other words, the predetermined condition is that the content category of the reference picture does not belong to the predetermined category. However, alternatively, the server can determine that the reference picture does not include malicious information by using a "whitelist" method, and the predetermined condition can be that the content category of the reference picture belongs to the predetermined category.

In addition, during determining of the picture quality, color information of the reference picture also relates to the number of pixels of the reference picture and the storage occupation space of the reference picture. For example, a color picture and a monochrome picture with the same number of pixels correspond to different storage occupation space, but the color picture and the monochrome picture can have the same resolution. Therefore, in the present application, the server can separately predetermine two conditions for storage occupation space for the color picture and the monochrome picture, namely, a color picture storage occupation space condition and a monochrome picture storage occupation space condition. Before determining whether the reference picture satisfies the predetermined condition, the server determines whether the reference picture is a color picture or a monochrome picture based on the color information of the reference picture, and determines the predetermined condition of the reference picture based on a determining result.

Alternatively, when determining the storage occupation space of the reference picture, the server can rectify the storage occupation space of the reference picture based on the color information of the reference picture. Specifically, a rectification coefficient can be determined based on experience, to rectify the storage occupation space of the reference picture. Certainly, other methods can also be used to rectify the storage occupation space of the reference picture in the present application, and the other methods are not limited.

Further, in the existing technology, there are a plurality of methods for filtering picture content categories, to reduce malicious information on the Internet. In the present application, the predetermined condition that the content category of the reference picture does not belong to the predetermined category can also be considered as a process of filtering picture content categories. Therefore, in the present application, the same method in the existing technology can be used to determine that the content category of the reference picture does not belong to the predetermined category. For example, a model generated through machine learning is used to determine whether content of the reference picture satisfies the predetermined condition, or filtering is performed manually to determine whether content of the reference picture satisfies the predetermined condition, or a combination of a plurality of methods is used. Implementations are not limited in the present application.

Certainly, if the server determines that the reference picture does not satisfy the predetermined condition, the server can further send prompt information to the user device and perform step S101 again until the reference picture returned by the user device satisfies the predetermined condition. The prompt information can include a predetermined condition that the reference picture does not satisfy. For example, when the number of pixels of the reference picture does not satisfy a requirement, the prompt information can include "The number of pixels of the picture you set does not satisfy the requirement. Please set quality of the picture again and send the picture again".

It is worthwhile to note that, in the present application, the server can determine whether the reference picture satisfies the predetermined condition before generating the security question. However, in the present application, considering that the server consumes resources in step S102, to reduce operating pressure of the server, reduce resource consumption, and reduce time waste, the server can determine whether the reference picture satisfies the predetermined condition when receiving the reference picture in step S101. Or the server can determine whether the reference picture satisfies the predetermined condition in step S102. A specific time when the server determines whether the reference picture satisfies the predetermined condition is not limited in the present application, and can be determined based on an actual application demand, provided that the time is earlier than generation of the security question.

Further, because the reference picture generated by the user device in step S101 can be a picture collected by a sensor of the user device (e.g., a picture taken by the user by using the camera of the user device), privacy information of the user may be leaked from the reference picture (e.g., privacy information of the user may be leaked from a license plate number or a house number if the user takes a car or a house of the user). Therefore, in this implementation of the present application, to reduce a probability that privacy of the user is leaked because the reference picture is used as an answer option for the security question, and better protect privacy of the user, before generating the security question, the server can blur the reference picture, and use a picture obtained after the blurring as a copy of the reference picture. In addition, in step S103, the server uses the copy of the reference picture and the confusion pictures as answer options, to generate the security question.

Specifically, the server can blur the reference picture based on a predetermined granularity value and blurring strength value, and use a picture obtained after the blurring as a copy of the reference picture. The granularity value and the blurring strength value can be set by a staff member based on an actual application demand.

In addition, during generation of the security question, the copy of the reference picture is the blurred reference picture. Therefore, there may be a difference between the copy of the reference picture and the confusion pictures in terms of resolution and picture quality. Therefore, when the server generates the security question by using the copy of the reference picture and the confusion pictures as answer options, a difference between the reference picture and the confusion pictures is too large, and the copy of the reference picture that is used as an answer option is too conspicuous in the answer options for the security question, thereby reducing security of the security question.

Therefore, in the present application, before generating the security question, the server can blur the determined confusion pictures corresponding to the reference picture, and use the copy of the reference picture and confusion pictures obtained after the blurring as answer options, to generate the security question. A process of blurring the confusion pictures can be consistent with a process of blurring the reference picture, and granularity values and blurring strength values used for the blurring can also be consistent, so that blurring degrees of answer options for the security question are consistent.

It is worthwhile to note that, if the reference picture is used as an answer option during generation of the reference picture, the confusion pictures do not need to be blurred. If the copy of the reference picture is used as an answer option during generation of the security question, the confusion pictures can be blurred.

Certainly, the server can blur the confusion pictures in advance when the confusion pictures need to be blurred, for example, when the server determines the confusion pictures corresponding to the reference picture. Or, the server blurs to-be-selected pictures when storing the to-be-selected pictures. Certainly, because accuracy of an extracted feature value of a blurred picture is relatively low, before blurring the to-be-selected pictures, the server can first extract feature values of the to-be-selected pictures, blur the to-be-selected pictures, locally store the to-be-selected pictures, the feature values of the to-be-selected pictures, and to-be-selected pictures obtained after the blurring, and record a correspondence between the to-be-selected picture, the feature value of the to-be-selected picture, and the to-be-selected picture obtained after the blurring. When determining the confusion pictures corresponding to the reference picture, the server can select the to-be-selected pictures obtained after the blurring from the to-be-selected picture pool, and use the to-be-selected pictures obtained after the blurring as the confusion pictures corresponding to the reference picture. Certainly, a specific time of blurring the confusion pictures is not limited in the present application.

Still further, because pictures generated by the user device are usually automatically stored on the user device, the reference picture can also be stored on the user device. Therefore, there is a potential security risk in the generated security question (e.g., if a lawbreaker invades the user device by using hacker software, and obtains the reference picture stored on the user device, a probability that the lawbreaker cracks the security question is increased). Therefore, in the present application, to improve security of the generated security question, the server can further send an instruction for deleting the reference picture to the user device before generating the security question, and locally store the reference picture and the copy of the reference picture. Certainly, the server can send the instruction for deleting the reference picture any time after receiving the reference picture and before generating the security question. Implementations are not limited in the present application.

In addition, in the present application, to enable the user to better understand the security question and better remember the reference picture, the server can further send the security question to the user device, so that the user tries to answer the security question, and returns an answer to the security question to the user device. As such, the user can better understand and remember the security question. In addition, the server can further send query information about whether to store the security question to the user device, and stores or deletes the security question based on a result returned by the user device.

Specifically, first, the server can send the generated security question to the user device, and determine an identity verification result of the user device based on the answer to the security question that is returned by the user device. Then, the server sends the identity verification result and the query information about whether to store the security question to the user device. Finally, the server stores the security question when the user device returns information indicating that the security question is to be stored; or deletes the security question when the user device returns information indicating that the security question is not to be stored. A detailed process can be shown in FIG. 3.

Figure 3:
FIG. 3 is a schematic diagram illustrating a process of sending a security question and sending storage query information, according to an implementation of the present application.

FIG. 3 is a schematic diagram illustrating a process of sending a security question and sending storage query information by a server, according to an implementation of the present application.

S1031: Send a generated security question to a user device.

S1032: Determine an identity verification result of the user device based on an answer to the security question that is returned by the user device.

S1033: Send the identity verification result and query information about whether to store the security question to the user device.

S1034: Store the security question when the user device returns information indicating that the security question is to be stored.

S1035: Delete the security question when the user device returns information indicating that the security question is not to be stored.

In the process shown in FIG. 3, a user can choose whether to use a reference picture to generate the security question while the user can better remember the reference picture, thereby improving user experience.

In addition, when any answer option for the security question described in FIG. 3 is a copy of the reference picture (but not the reference picture), the server can further return a correct answer option, namely, the copy of the reference picture, to the user device when an answer selected by the user is not an answer option corresponding to the copy of the reference picture, so that the user knows a blurring degree of the copy of the reference picture after the reference picture is blurred. As such, the user can know the blurring degree while the user can better remember the copy of the reference picture, and the user can better understand the process of generating the security question. Therefore, the user is more willing to use the security question.

Certainly, in the present application, the server may not send both the security question and the query information about whether to store the security question. To be specific, the server can send only the security question, and determine whether to store the security question based on the answer to the security question that is returned by the user device. Or, the server can send only the query information about whether to store the security question, and store the security question when the user device returns the information indicating that the security question is to be stored, or vice versa.

Specifically, as shown in step S10311 to step S10314, whether to store the security question is determined based on the identity verification result.

Step S10311: The server can send the generated security question to the user device.

Step S10312: Determine the identity verification result of the user device based on the answer to the security question that is returned by the user device.

Step S10313: Determine to store the security question when the identity verification succeeds.

Step S10314: Delete the security question when the identity verification fails.

Alternatively, as shown in step S10321 to step S10324, whether to store the security question is determined based on information returned by the user device.

Step S10321: Send the query information about whether to store the security question to the user device.

Step S10322: Store the security question when the user device returns the information indicating that the security question is to be stored.

Step S10323: Delete the security question when the user device returns the information indicating that the security question is not to be stored.

Further, a probability that any security question is cracked becomes higher as the number of times of using the security question increases after the security question is used for a long time. In addition, if the security question is not used for a long time, memory of the user for the security question decreases, and accuracy of the security question decreases. Therefore, in the present application, to improve security of the security question and accuracy of the security question, the server can determine a validity period corresponding to an identifier of the security question when generating the security question. When the security question needs to be used, the server determines whether to use the security question based on the validity period of the identifier of the security question. Specifically, when the security question needs to be used, the server determines whether the security question is in the validity period at a current time, and if yes, the security question can be used, or vice versa.

Still further, in the existing technology, to improve identity verification accuracy, one account identifier can usually correspond to a plurality of security questions used for identity verification. However, in the existing technology, considering the willingness of the user to use an identity verification process, all security questions are not sent to the user device for identity verification in one identity verification process, and the certain number of security questions can be determined for identity verification based on a priority of each security question. In addition, an identifier of a security question can be selected by using a method that determines a probability of selecting the identifier of the security question based on a priority corresponding to the identifier of the security question at the current time. For example, a probability of selecting the identifier of the security question increases with a priority corresponding to the identifier of the security question at the current time.

Therefore, in the present application, when the server determines that the account corresponds to a plurality of security questions, when generating the security question, the server can set a priority of the identifier of the security question (namely, an initially set priority of the identifier of the security question), and the initially set priority of the identifier of the security question can decrease as duration from a generation time of the identifier of the security question to the current time increases, until the priority is reduced to a predetermined basic priority. A specific process can be shown in FIG. 4a or FIG. 4b.

Figure 4A:
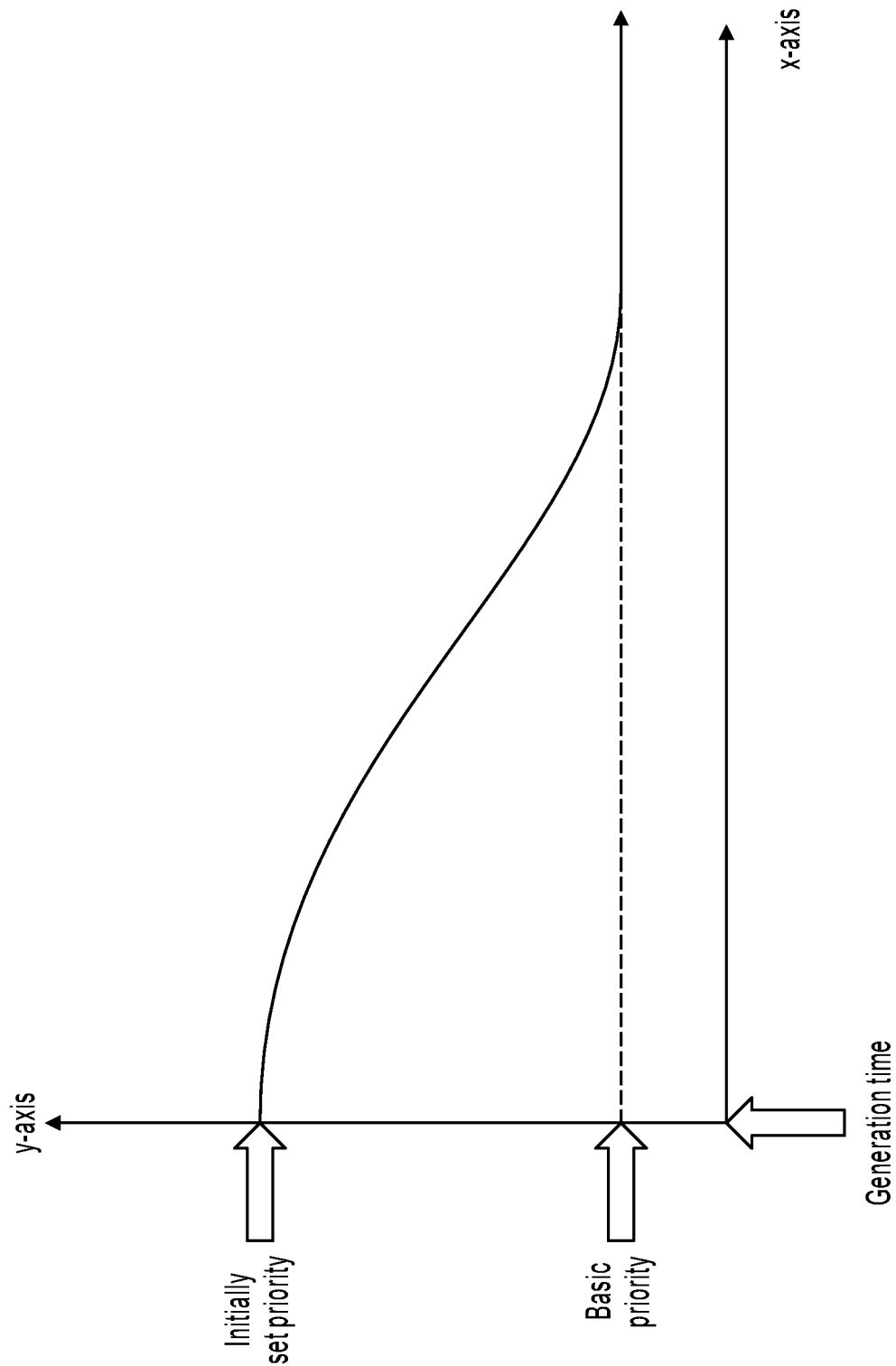
FIG. 4a and FIG. 4b are schematic diagrams illustrating that a priority of an identifier of a security question varies with time, according to an implementation of the present application.
Figure 4B:
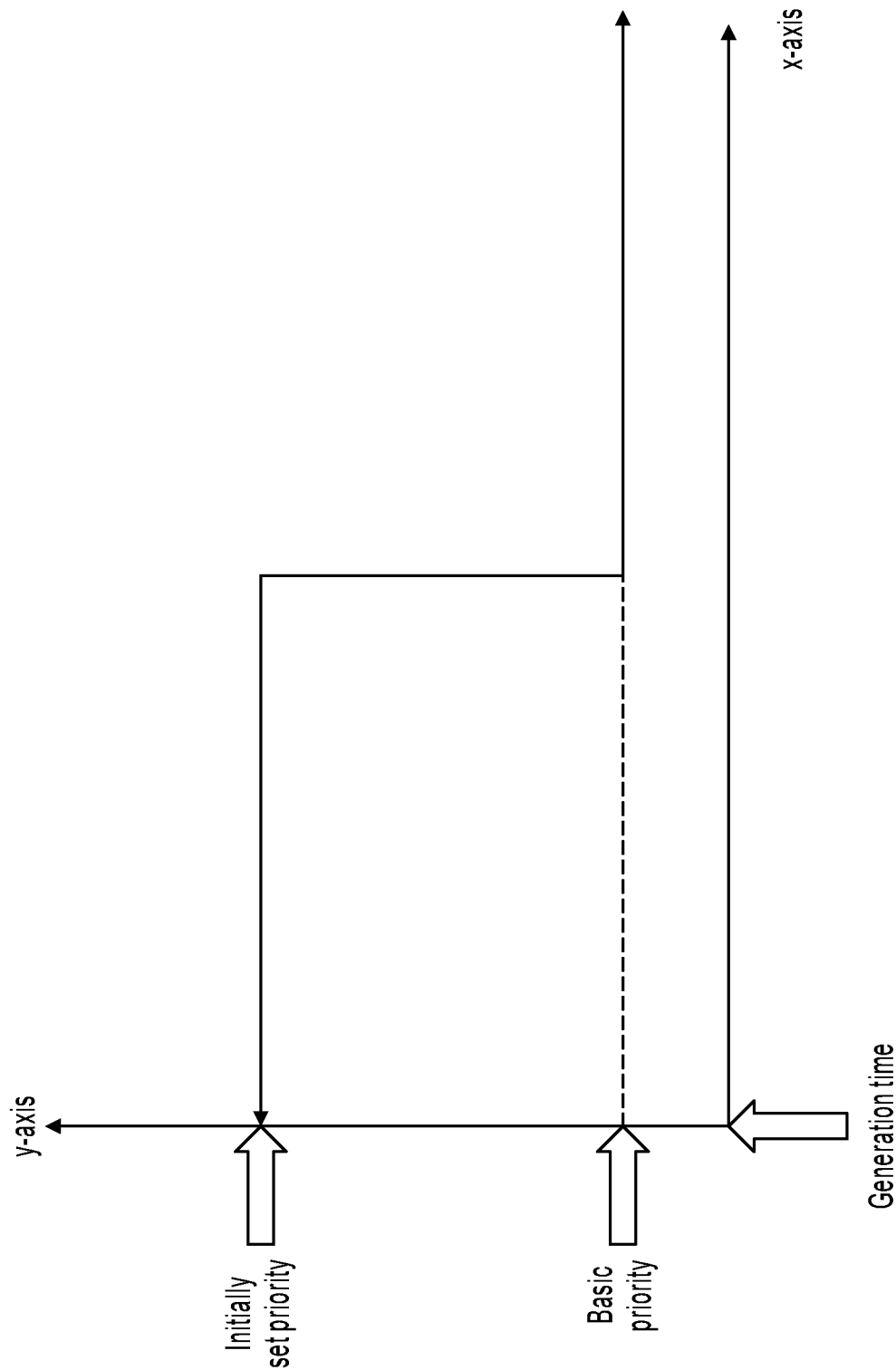

FIG. 4a is a schematic diagram illustrating that a priority of an identifier of a security question varies with time, according to an implementation of the present application. A horizontal axis (namely, the x-axis) is a time axis, and a vertical axis (namely, the y-axis) indicates a priority. A higher point on the y-axis corresponds to a higher priority. It can be seen that when an identifier of a security question shown in FIG. 4 is generated, a priority corresponding to the identifier of the security question gradually decreases with time from an initial time on the x-axis, until the priority is reduced to a reference priority. In addition, in the present application, there can be a plurality of implementations of how the priority of the identifier of the security question decreases with time. As shown in FIG. 4b, the priority of the identifier of the security question does not change gradually but changes abruptly. Certainly, how the specified priority changes with time is not limited in the present application, and it can be determined as required in practice.

In the present application, the identifier of the security question can be determined by using a method that determines a probability of selecting the identifier of the security question based on the priority corresponding to the identifier of the security question. For example, a probability of selecting the identifier of the security question increases with the priority of the identifier of the security question. Therefore, through the priority change setting shown in FIG. 4a and FIG. 4b, a probability that the security question is used for identity verification is relatively high after the security question is generated, so that the user can have more contact with the security question, and the user can better remember the security question. In other words, a probability of being selected as a security question for identity verification is relatively higher for a security question corresponding to a relatively higher priority, so that a probability that the user answers the security question increases, and the user can better remember the security question.

In addition, in the present application, in step S101, the reference picture is not necessarily generated by the user device, and the reference picture can be sent by the server to the user device.

Specifically, the server sends a security question generation instruction and several to-be-selected pictures to the user device, so that the user operating the user device selects and confirms a picture as the reference picture, and the server can receive the picture that is selected from the several to-be-selected pictures and returned by the user device based on the generation instruction, and use the picture as the reference picture. The to-be-selected picture can be set by a staff member, or can be determined from the to-be-selected picture pool on the server. Certainly, in the present application, the to-be-selected picture sent by the server can be determined from the to-be-selected picture pool, or can be determined by the server by using another method. In other words, a method for determining or selecting the several to-be-selected pictures is not limited in the present application.

In addition to the method in step S102 in the present application that the confusion pictures are determined by determining the feature value of the reference picture, when determining the confusion pictures corresponding to the reference picture, the server can determine a lattice vector corresponding to the reference picture, and determine the confusion pictures corresponding to the reference picture by using the lattice vector and a predetermined value setting policy.

Specifically, the server can generate a pixel matrix based on each pixel of the reference picture, and use the pixel matrix as a lattice to determine a vector corresponding to the reference picture. Then, the server can determine a range of a distance between a vector of a confusion picture and a vector of the reference picture in the lattice based on the predetermined value setting policy, select a to-be-selected picture from the to-be-selected picture pool, and use the to-be-selected picture as a confusion picture corresponding to the reference picture, where a distance between a vector of the to-be-selected picture and the vector of the reference picture falls within the distance range.

For the pixel matrix, each element in the pixel matrix can correspond to a grayscale value of one pixel of the reference picture, or each element in the pixel matrix can correspond to an average value of grayscale values of a plurality of pixels in the reference picture. Therefore, a feature of the reference picture can be represented by using the pixel matrix.

For convenience of subsequent operations, the server can further generate the pixel matrix into a corresponding vector form. In this case, a vector space dimension of the vector can be a dimension of the pixel matrix. In other words, the vector of the reference picture is determined in a vector space corresponding to the pixel matrix.

In addition, the predetermined value setting policy is used to determine a distance range for a vector of a confusion picture that is neither too close nor too far from the vector of the reference picture.

Specifically, the value setting policy can be that a distance from the vector of the reference picture is not shorter than a predetermined minimum distance, and is not longer than a predetermined maximum distance. In this case, the server can determine, from the to-be-selected picture pool based on the distance range, a to-be-selected picture whose vector falls within the distance range in the vector space corresponding to the pixel matrix, and use the to-be-selected picture as a confusion picture, as shown in FIG. 5.

Figure 5:
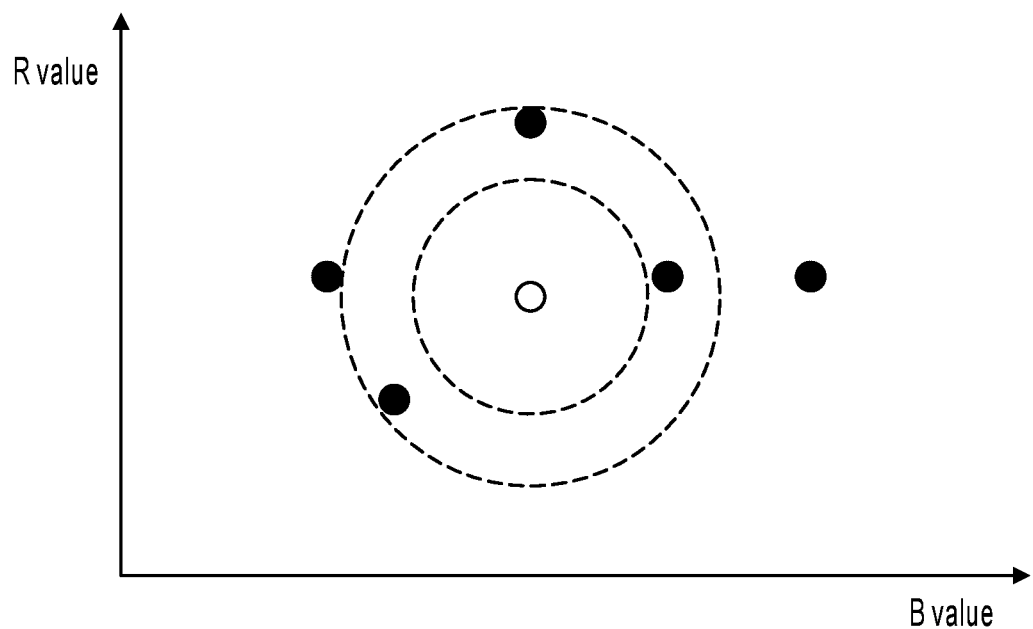
FIG. 5 illustrates a correspondence between a distance range, a vector of each to-be-selected picture, and a vector of a reference picture in a vector space, according to an implementation of the present application.

FIG. 5 illustrates a correspondence between a distance range, a vector of each to-be-selected picture, and a vector of a reference picture in a vector space, according to an implementation of the present application.

It can be seen that the vector space is determined by an R value and a B value in a pixel matrix, each solid point is a vector of each to-be-selected picture in the vector space, a hollow point is a vector of the reference picture in the vector space, and a ring-shaped area enclosed by a dashed line is the distance range. In this case, a to-be-selected picture corresponding to a vector that falls within the distance range can be used as a confusion picture corresponding to the reference picture.

Certainly, each pixel of the reference picture can be represented by a Red value, a Blue value, and a Green value (RGB). Therefore, each element in the pixel matrix can also be determined by an average value, a maximum value, or a minimum value of RGB values of a pixel of the reference picture, or determined by an R value of a pixel of the reference picture, or determined by a B value of a pixel of the reference picture, or determined by a G value of a pixel of the reference picture.

Therefore, for the reference picture, a plurality of vectors in a plurality of vector spaces can be generated, or a plurality of vectors in one vector space can be generated. For example, the reference picture corresponds to a vector determined by an average value of RGB values of each pixel in a vector space generated based on a pixel matrix corresponding to the RGB values, or corresponds to a vector determined by an R value of each pixel in a vector space generated based on a pixel matrix corresponding to the R value, or corresponds to three vectors determined by an R value, a B value, and a G value of each pixel in a vector space generated based on a pixel matrix corresponding to the RGB values. A plurality of methods can be used to generate the vector of the reference picture, and the methods are not limited in the present application.

Still further, because reference pictures generated by different devices can have different numbers of pixels, to make a subsequently determined confusion picture more accurate, the server can further count the number of pixels of each to-be-selected picture and the number of pixels of the reference picture.

Specifically, if the number of pixels that is selected by the server is 1600×1200, when the server receives the reference picture, the server can fixedly set the number of pixels of the reference picture to 1600×1200 before performing a subsequent operation. Certainly, when determining each to-be-selected picture, the server can fixedly set the number of pixels of the to-be-selected picture. Certainly, the number of pixels of the reference picture that is fixedly set by the server is not limited in the present application, and the number of pixels can be determined based on a requirement of picture quality of the reference picture.

It is worthwhile to note that the steps of the method provided in this implementation of the present application can be performed by the same device, or can be performed by different devices. For example, step S101 and step S102 can be performed by device 1, and step S103 can be performed by device 2. For another example, step S101 can be performed by device 1, and step S102 and step S103 can be performed by device 2. In other words, the server can be a distributed server including a plurality of devices. In addition, the steps of the method provided in this implementation of the present application are not necessarily performed by the server, and can be performed by a user device. The user device can be a mobile phone, a personal computer, a tablet, etc.

Figure 6:
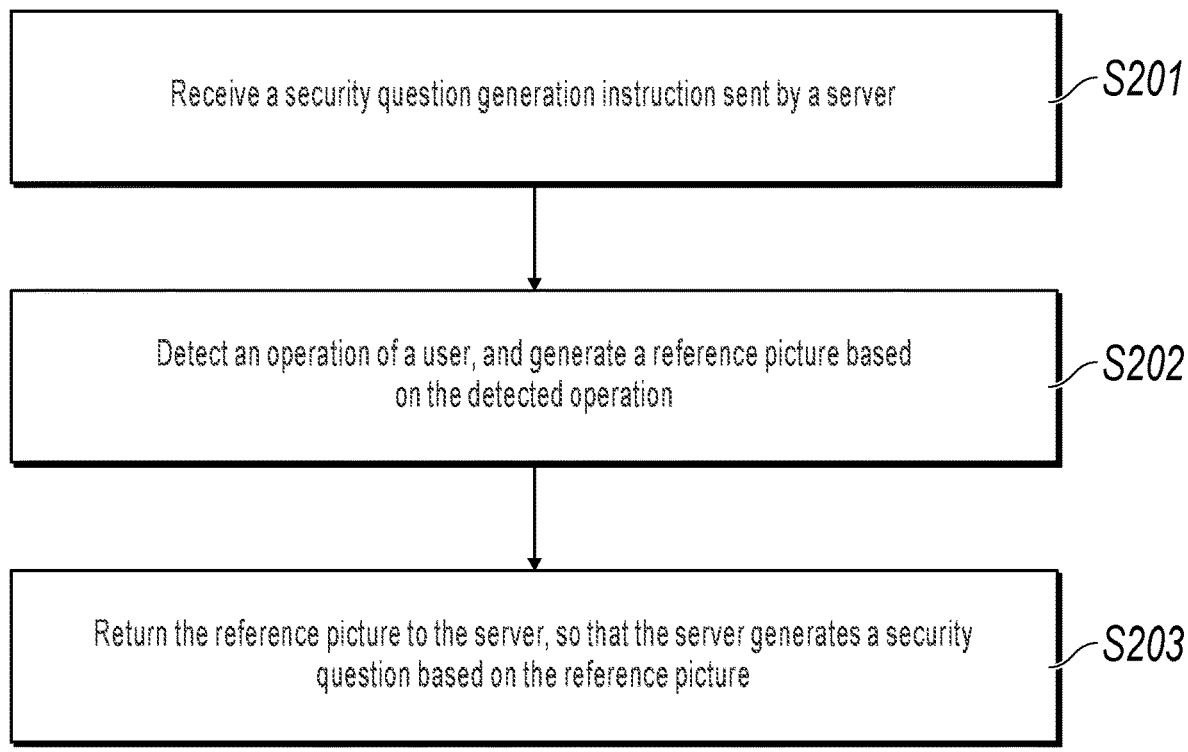
FIG. 6 illustrates a process of generating a security question, according to an implementation of the present application.

Based on the process of generating a security question shown in FIG. 1, an implementation of the present application further provides a method for generating security questions, as shown in FIG. 6.

FIG. 6 illustrates a process of generating a security question, according to an implementation of the present application. The process includes the following steps.

S201: Receive a security question generation instruction sent by a server.

Because a user usually uses a user device to initiate or execute a service, identity verification is also performed for an account logged in on the user device. Therefore, in this implementation of the present application, the user device used by the user can receive the security question generation instruction sent by the server, and perform a subsequent operation based on the generation instruction. The user device includes a mobile phone, a personal computer, a tablet, etc.

Specifically, the generation instruction can include JavaScript (JS) code, the JS code includes instruction information, and the instruction information can include characters, audio, videos, etc. The instruction information is used to instruct the user of the user device to perform an operation, and the JS code runs on the user device to display the instruction information, so that the user device can perform a subsequent operation.

Figure 7:
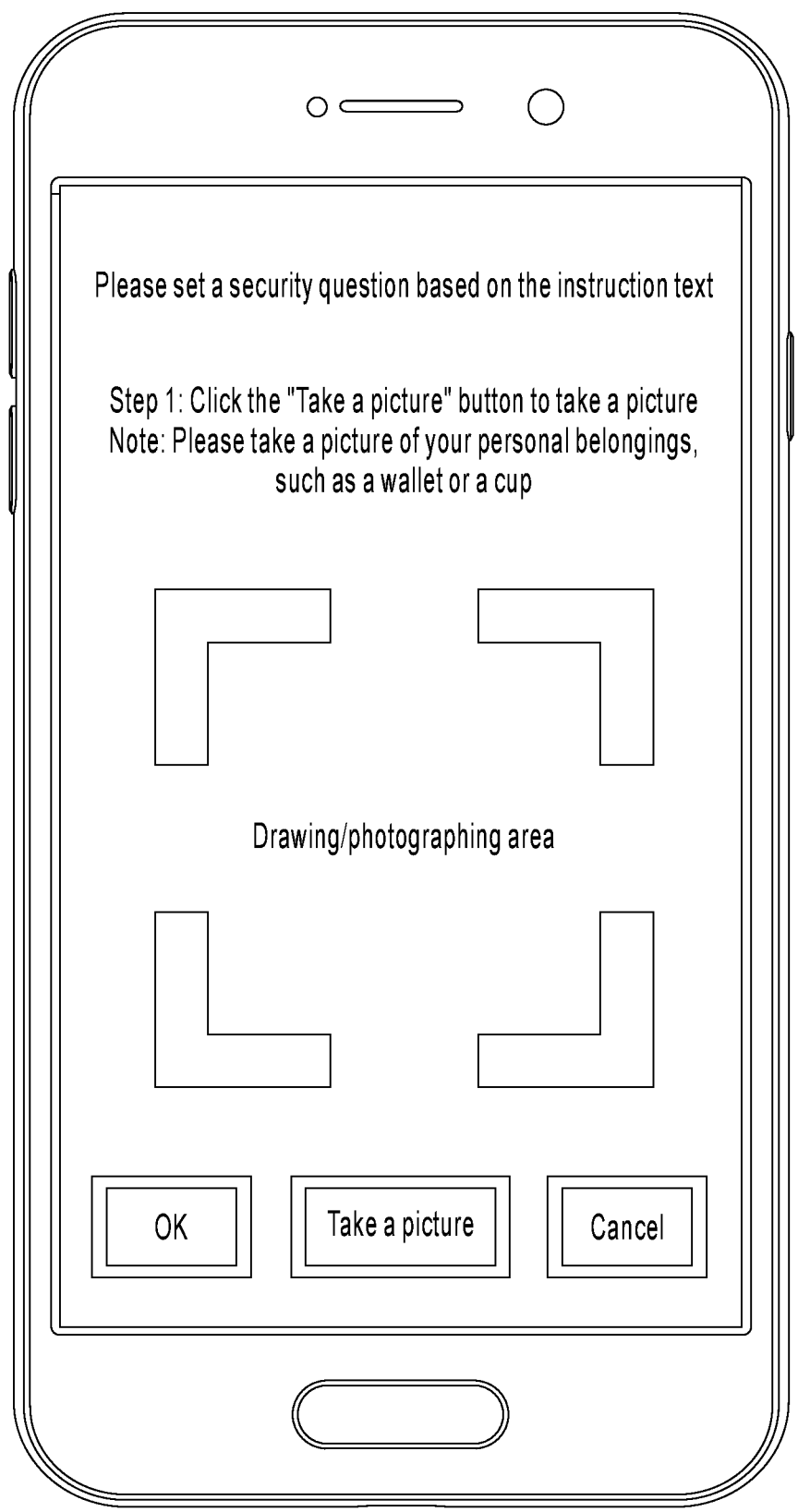
FIG. 7 is a schematic diagram illustrating a reference picture setting interface, according to an implementation of the present application.

For example, the user device runs the JS code included in the generation instruction, to display a setting interface used to set a reference picture, as shown in FIG. 7.

FIG. 7 is a schematic diagram illustrating a reference picture setting interface, according to an implementation of the present application. It can be seen that, the text describes how to set a picture, and describes buttons "Take a picture", "OK", and "Cancel", and an area displaying a user drawing result or picture. The user device can detect a gesture operation of the user in the area of the drawing result or the picture, or operations performed by the user on the buttons.

Further, the instruction information can be set by a staff member based on an actual application situation. For example, the instruction information is character information "Please take a picture of your wallet", a voice produced by audio information "Please take a picture of your cup", or an image played by video information that is used to instruct the user to draw a specific picture. A specific form and specific content of the instruction information are not limited in the present application.

Certainly, in the present application, it is only an implementation that the generation instruction is received by the user device, and in other implementations, the generation instruction can be received by other devices such as a server different from the server sending the generation instruction. For ease of description, description is provided subsequently by using an example that the user device performs the process of generating the security question shown in FIG. 6.

It is worthwhile to note that, in the present application, the generation instruction does not necessarily include the JS code, the generation instruction can include code in another language (e.g., Language C++ or Language C#), and the user device can display the instruction information by running the code in the another language.

S202: Detect an operation of a user, and generate a reference picture based on the detected operation.

In this implementation of the present application, the user device can detect the operation of the user, and determine the reference picture generated on the user device, to continue to perform subsequent steps, so that the server generates a security question.

Specifically, in step S201, the user device can instruct the user using the user device to draw or take a picture. Therefore, in step S202, the user device can detect the operation of the user, and generate the reference picture based on the detected operation.

The user device can detect a gesture operation of the user in a specified area, and use a picture generated by the gesture operation as the generated reference picture; or the user device can detect the operation of the user, and use a picture collected by a sensor as the generated reference picture. In other words, the user device can detect a picture "drawn" by the gesture operation of the user and use the picture as the reference picture, or can detect the operation of the user, and use, as the reference picture, the picture collected by the sensor of the user device during the operation of the user. The sensor can be a camera of the user device, or another sensor, provided that data collected by the sensor can be used as a reference picture.

For example, in the interface shown in FIG. 7, when the user device detects an operation of clicking the "OK" button by the user, the user device can determine that a picture in the area displaying a user drawing result or picture is the reference picture generated on the user device.

In addition, in the present application, the sensor is not necessarily a picture collection sensor, and can be another sensor. For example, when the sensor is an acceleration sensor, the user device can process, as a picture, acceleration data collected by the acceleration sensor during the operation of the user, and use the picture as the reference picture. For another example, when the sensor is a sound sensor (e.g., a microphone), the user device can process, as a picture, audio data collected by the sound sensor during the operation of the user, and use the picture as the reference picture.

S203: Return the reference picture to the server, so that the server generates a security question based on the reference picture.

In this implementation of the present application, after determining the reference picture, the user device can return the reference picture to the server, so that the server performs the steps S102 to S104 shown in FIG. 1 to generate the security question. Details are omitted in the present application for simplicity.

It is worthwhile to note that the steps of the method provided in this implementation of the present application can be performed by the same device.

Figure 8:
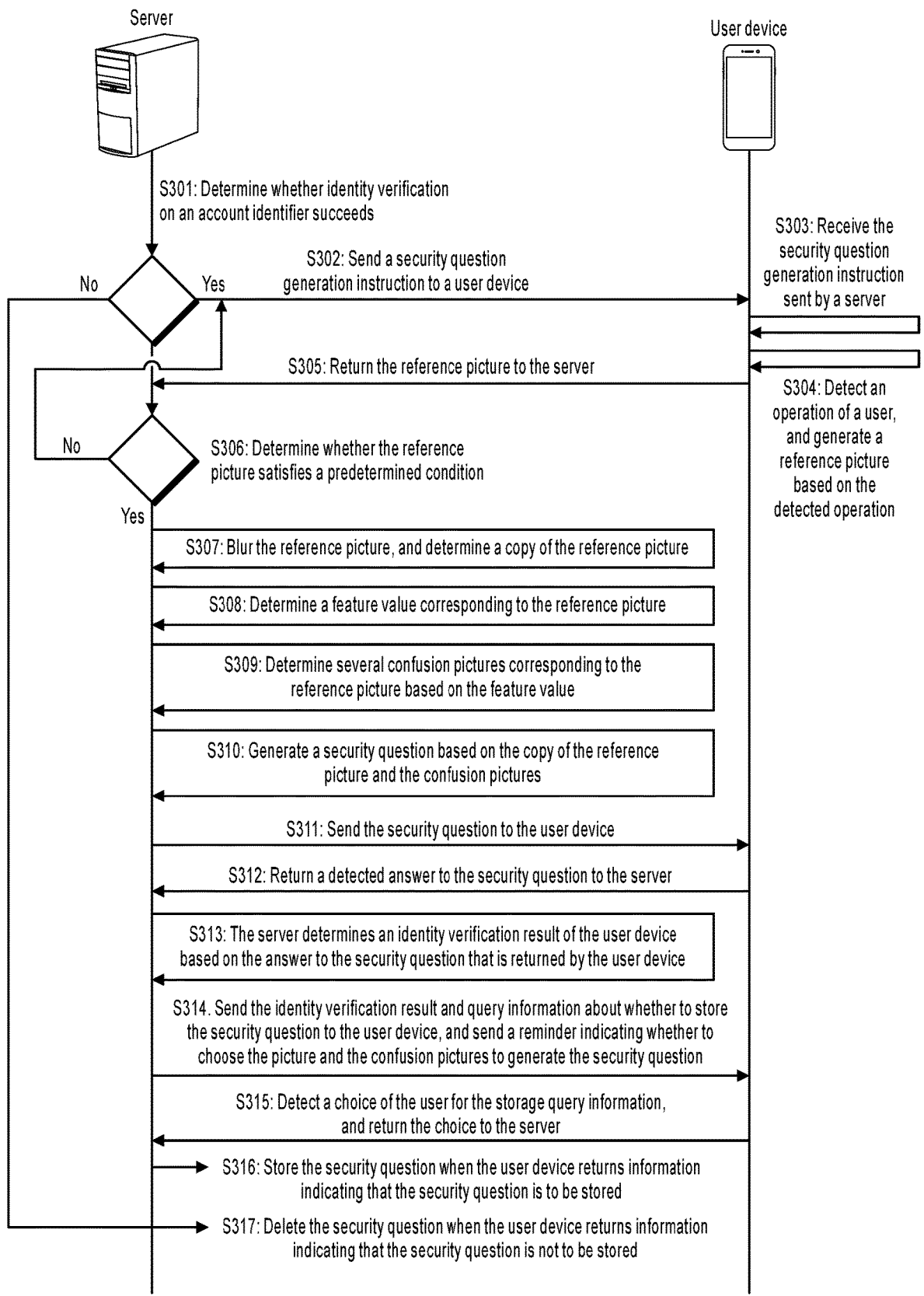
FIG. 8 is a detailed flowchart illustrating generation of a security question, according to an implementation of the present application.

Based on the previous description, an implementation of the present application further provides a detailed process of generating a security question, as shown in FIG. 8.

FIG. 8 is a detailed flowchart illustrating generation of a security question, according to an implementation of the present application.

S301: A server determines whether identity verification on an account identifier succeeds, and if yes, performs step S302, or if no, performs step S318.

S302: Send a security question generation instruction to a user device.

S303: The user device receives the security question generation instruction sent by the server.

S304: The user device detects an operation of a user, and generates a reference picture based on the detected operation.

S305: The user device returns the reference picture to the server.

S306: The server receives the reference picture, determines whether the reference picture satisfies a predetermined condition, and if yes, performs step S307, or if no, performs step S302 again.

S307: The server blurs the reference picture, and determines a copy of the reference picture.

S308: The server determines a feature value corresponding to the reference picture.

S309: The server determines several confusion pictures corresponding to the reference picture based on the feature value.

S310: The server generates a security question based on the copy of the reference picture and the confusion pictures.

S311: The server sends the generated security question to the user device.

S312: The user device receives the security question, and returns a detected answer to the security question to the server.

S313: The server determines an identity verification result of the user device based on the answer to the security question that is returned by the user device.

S314: The server sends the identity verification result and query information about whether to store the security question to the user device.

S315: The user device detects a choice of the user for the storage query information, and returns the choice to the server.

S316: Store the security question when the user device returns information indicating that the security question is to be stored.

S317: Delete the security question when the user device returns information indicating that the security question is not to be stored.

S318: Do not generate a security question.

It is worthwhile to note that the user device can be a mobile phone, a personal computer, etc. The server can be a standalone device, or can be a system including a plurality of devices. In addition, the step of determining whether the reference picture satisfies the condition in step S306 can be performed in a subsequent step, provided that step S306 is performed before step S316, and the process of blurring the reference picture in step S307 only needs to be performed before step S310.

In addition, in step S316 or step S310, when the server determines to generate the security question, the server can further store a correspondence between the account identifier, the reference picture, the copy of the reference picture, the confusion pictures, and an identifier of the security question, so that the security question can be generated repeatedly.

Further, in step S308 and step S309, in addition to determining the confusion pictures by using the feature value, the server can first determine a lattice vector corresponding to the reference picture, and then determine the confusion pictures corresponding to the reference picture by using the lattice vector and a predetermined value setting policy. Details are omitted in the present application for simplicity.

Figure 9:
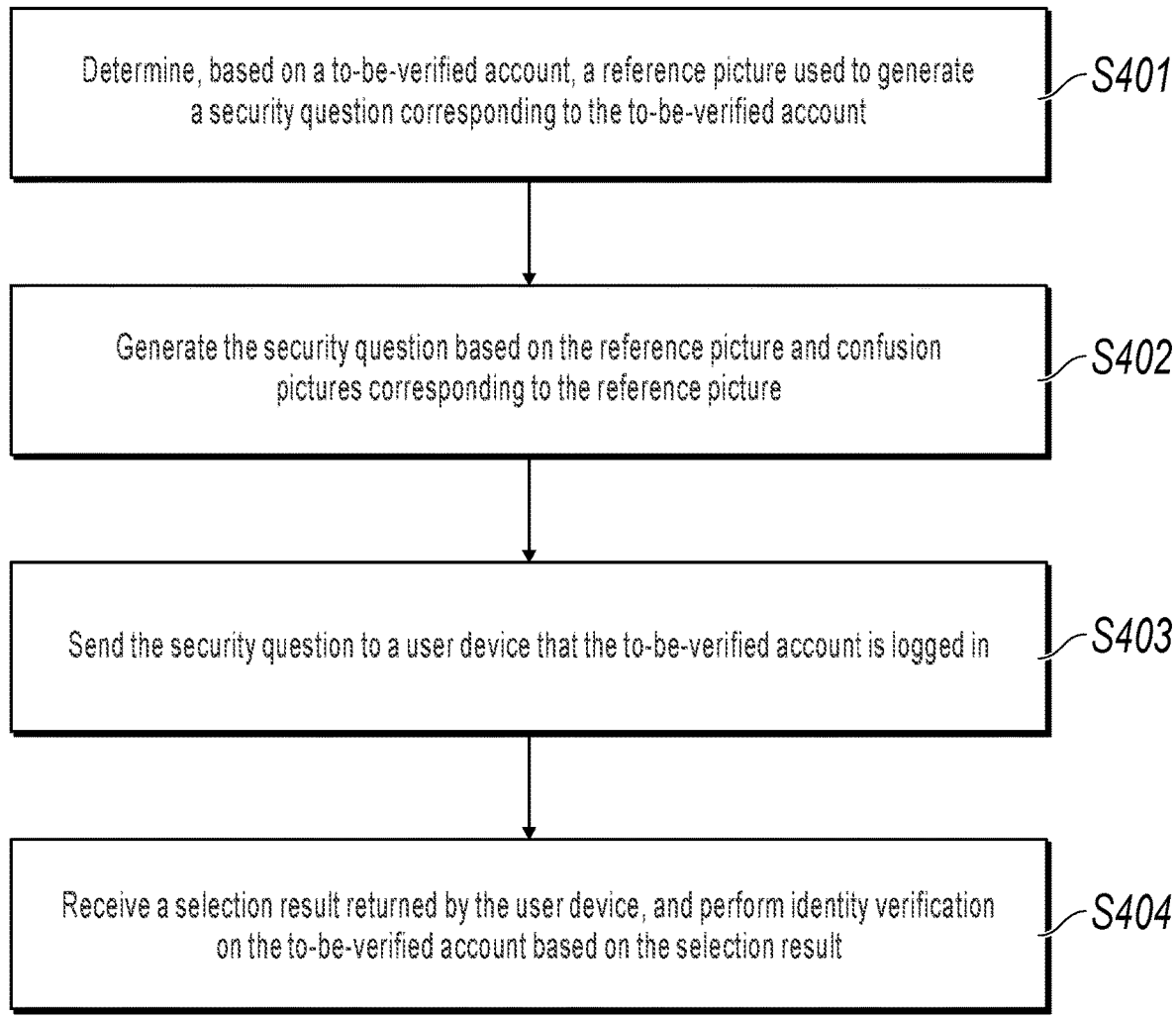
FIG. 9 illustrates a method for verifying identities, according to an implementation of the present application.

An implementation of the present application further provides a method for verifying identities by using a security question generated based on the method shown in FIG. 1, FIG. 6, or FIG. 8, as shown in FIG. 9.

FIG. 9 illustrates a method for verifying identities, according to an implementation of the present application. The method includes the following steps.

S401: Determine, based on a to-be-verified account, a reference picture used to generate a security question corresponding to the to-be-verified account.

In the existing technology, an identity verification process can be initiated by a server, or can be initiated by a user device, but how the identity verification is initiated is not involved in the present invention. However, a security question is usually determined and sent to the user device by the server. Therefore, in the present application, the to-be-verified account can be determined by the server.

Identity verification is usually performed for an account. Therefore, in the present application, the server determines the to-be-verified account, and the server can further determine the reference picture used to generate the security question based on the to-be-verified account that is determined.

Specifically, the server can first determine the to-be-verified account, and then determine the reference picture corresponding to the to-be-verified account by using a stored correspondence between an account and each reference picture. Certainly, if the correspondence is not stored on the server, it indicates that no corresponding security question is generated or no security question is available for the to-be-verified account, and the identity verification process ends.

S402: Generate the security question based on the reference picture and confusion pictures corresponding to the reference picture.

In this implementation of the present application, after determining the reference picture corresponding to the to-be-verified account, the server can generate the security question for a subsequent identity verification process.

Specifically, the server can determine several confusion pictures based on a correspondence between the reference picture and the confusion pictures, and generate the security question by using the method in step S104 shown in FIG. 1.

In addition, when generating the security question, the server stores data such as an identifier of the security question, the reference picture, and the correspondence between the reference picture and the confusion pictures, so that the security question can be determined during identity verification. In addition, the identifier of the security question can correspond to a validity period. Before generating the security question, the server can determine whether the identifier of the security question is in the validity period at a current time. If yes, the server determines to generate the security question. If no, the server does not generate the security question, and returns expiration information to the user device.

Further, when the server determines to generate the security question, a user of the user device can answer the security question in the subsequent identity verification process, and the user can better remember the security question. In this case, when the security question is subsequently used for identity verification, a probability that the user still remembers the security question is relatively high. Therefore, in the present application, the server can further prolong the validity period of the identifier of the security question, to prolong a usage time of the security question.

S403: Send the security question to a user device that the to-be-verified account is logged in.

S404: Receive a selection result returned by the user device, and perform identity verification on the to-be-verified account based on the selection result.

In this implementation of the present application, after generating the security question by using the method described in step S104 in FIG. 1, the server can send the security question to the user device, and receive the selection result returned by the user device, so as to perform identity verification on the to-be-verified account based on the selection result.

Specifically, because answer options for the security question separately correspond to the reference picture and the confusion pictures, the selection result returned by the user device and received by the server is also one of the answer options, in other words, the selection result is either the reference picture or one of the confusion pictures. Therefore, when performing identity verification on the to-be-verified account based on the selection result, the server can determine whether the selection result matches the reference picture. If yes, the server can determine that the identity verification succeeds. If no, the server can determine that the identity verification fails.

Certainly, in the existing technology, to improve identity verification accuracy, one account can usually correspond to a plurality of security questions (in other words, the plurality of security questions are generated for the account). During identity verification, the server can select and send a plurality of security questions to the user device, and perform identity verification based on selection results for all the security questions that are returned by the user device. Therefore, in the present application, the to-be-verified account can correspond to a plurality of security questions.

In addition, in many cases, the identity verification method can be used to verify whether the to-be-verified account has permission to continue to execute a service. Therefore, the identity verification method in the present application can be used to perform identity verification for a logging in operation, identity verification for a payment operation, identity verification for modification of personal information, etc. A specific time of performing identity verification can be determined based on an actual application demand, and the time is not limited in the present application.

For the identity verification for the payment operation, technologies involved for the payment in this implementation of the present application can include Near Field Communication (NFC), Wi-Fi, 3G/4G/5G, a POS card reading technology, a QR code scanning technology, a barcode scanning technology, Bluetooth, an infrared technology, short message service (SMS), multimedia message service (MMS), etc. In other words, a payment method including but not limited to the described technologies can be used during the payment operation, and the identity verification method in the present application can be used for identity verification.

It is worthwhile to note that, in the plurality of security questions corresponding to the to-be-verified account, a security question can be generated by instructing the user to predetermine content of the security question and an answer to the security question, or a security question used for identity verification is generated by collecting and analyzing historical behavior data of the user, or a security question is generated by using the method shown in FIG. 1 in the present application. Implementations are not limited in the present application. In addition, when selecting a security question, the server can determine each security question used for identity verification based on an identifier of the selected security question.

Based on the previous description, before performing step S401 in the present application, the server can select, from identifiers of the security questions corresponding to the to-be-verified account, an identifier of the security question generated based on the reference picture.

Specifically, the server can select the identifier of the security question generated based on the reference picture by using at least one of the following methods: selecting an identifier of a security question that is in a validity period at a current time based on validity periods corresponding to the identifiers of the security questions; selecting an identifier of a security question that is not in a cooldown period at the current time based on cooldown periods corresponding to the identifiers of the security questions; and selecting an identifier of a security question based on priorities corresponding to the identifiers of the security questions.

When generating an identifier of each security question, the server can set a validity period for the identifier of the security question. Therefore, when selecting a security question used to perform identity verification on the to-be-verified account, the server can select the identifier of the security question that is in the validity period at the current time. As described above, after selecting the identifier of the security question that is in the validity period at the current time, the server can prolong the validity period corresponding to the selected identifier of the security question. Details are omitted for simplicity.

If the same security question frequently occurs in a period of time, security of the security question may decrease. Therefore, in the present application, the server can select the identifier of the security question that is not in the cooldown period at the current time, and after selecting the identifier of the security question, set a corresponding cooldown period for the identifier of the security question. Duration of the cooling period can be set by a staff member based on an actual application demand.

Likewise, the server can select a security question used for identity verification by using a method that determines a probability of selecting a security question based on a priority. For example, a probability of selecting a security question increases with a priority. Therefore, in addition to setting the cooldown period, the server can decrease a priority of the selected identifier of the security question after selecting the identifier of the security question, so that a probability that the identifier of the security question is selected in each of several consecutive identity verification processes is reduced.

Further, the server can select an identifier of a security question by using a method that for an identifier of each security question, a probability of selecting the identifier of the security question increases with a priority corresponding to the identifier of the security question at the current time. A priority initially set for the identifier of the security question decreases as duration from a generation time of the identifier of the security question to the current time increases, until the priority is reduced to a predetermined basic priority.

Still further, when the priority of the selected identifier of the security question is not the basic priority, after the server reduces the priority of the identifier of the security question, the priority can be gradually restored as time passes by, until the priority is restored to a priority corresponding to the identifier of the security question when the identifier of the security question is selected, and then the priority of the identifier of the security question is gradually reduced as time passes by. When the priority of the selected identifier of the security question is the basic priority, after the server reduces the priority of the identifier of the security question, the priority of the identifier of the security question can be gradually restored to the basic priority as time passes by. In other words, the server can reduce cases that an identifier of a security question can hardly be selected because a priority of the identifier is always relatively low after the identifier of the security question is selected. Because the priority can be restored as time passes by, a probability that the server selects the identifier of the security question also returns to normal when the priority of the identifier of the security question returns to normal (e.g., returning to a basic priority).

Certainly, there can be one or more identifiers of security questions that are selected by the server by using at least one of the three methods described above. A specific method is not limited in the present application.

It is worthwhile to note that the steps of the method provided in this implementation of the present application can be performed by the same device, or can be performed by different devices. For example, step S401 and step S402 can be performed by device 1, and step S403 can be performed by device 2. For another example, step S401 can be performed by device 1, and step S402 and step S403 can be performed by device 2. In other words, the server can be a distributed server including a plurality of devices.

Figure 10:
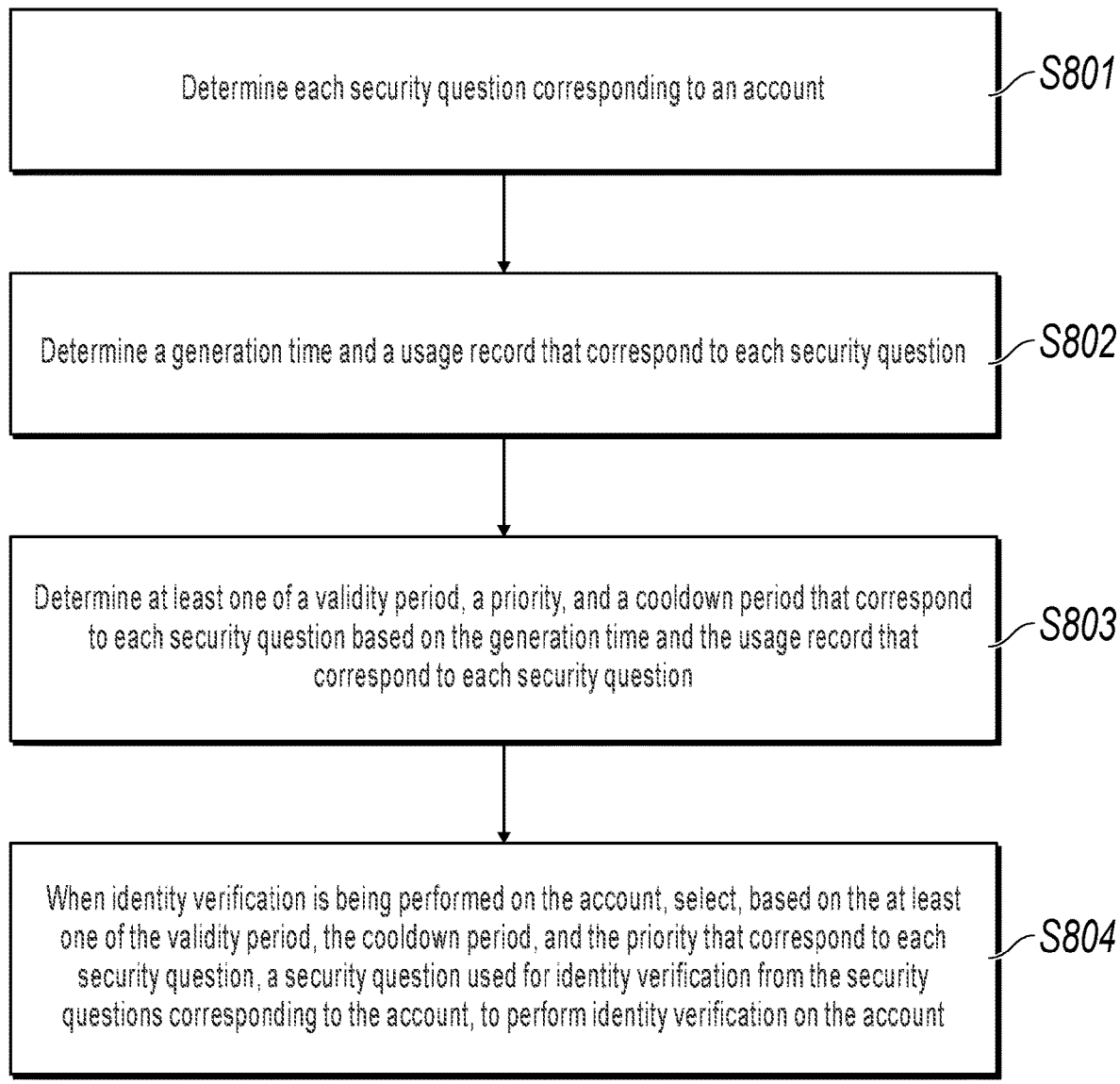
FIG. 10 illustrates a method for managing security questions, according to an implementation of the present application.

Based on the identity verification process shown in FIG. 9, the present application further provides a method for managing security questions, as shown in FIG. 10.

FIG. 10 illustrates a method for managing security questions, according to an implementation of the present application. The method includes the following steps.

S801: Determine each security question corresponding to an account.

Security questions can usually be managed on a server. Therefore, in this implementation of the present application, the server determines each security question corresponding to the account. The server can manage security questions for all accounts stored on the server. Therefore, the account can be any account stored on the server in the present application, and for ease of description, management of security questions corresponding to the account is described subsequently.

Specifically, if the server determines an account that security question management needs to be performed, the server can first determine an identifier of each security question corresponding to the account. When generating any security question, the server can set an identifier for the security question, so that the security question can be managed and used, and the security question can be used to perform identity verification on only one account. Therefore, there can be a correspondence between the identifier of the security question and the account. Therefore, in the present application, the server can determine the identifier of each security question corresponding to the account. Certainly, the security questions are not necessarily determined by the server by using identifiers of the security questions in the present application, and the server can determine the security questions by using other methods. For example, the server determines a security question corresponding to each account by using a stored correspondence between the account and each security question.

S802: Determine a generation time and a usage record that correspond to each security question.

In the present application, the generation time and the usage record of each security question are related to management of the security question. For example, if a security question has not been used for a relatively long time after being generated, a user is very likely to be unable to remember the security question, and therefore, accuracy of performing identity verification by using the security question cannot be ensured. For another example, if a security question is used a plurality of times on one day, the security question is frequently exposed, and security of the security question is likely to be reduced. Therefore, to manage each security question, the server needs to further determine the generation time and the usage record that correspond to each security question.

Specifically, during generation of each security question, the server generating the security question can further generate a corresponding identifier for the security question, namely, the identifier of the security question. Therefore, the server can determine a generation time of the security question based on a generation time of the identifier of the security question. For example, the server can read the first historical record corresponding to the identifier of the security question, or a generation record of the identifier of the security question, and determine the generation time of the identifier of the security question based on the record. Certainly, how the server determines the generation time of the identifier of the security question is not limited in the present application, and can be set by a staff member based on an actual application demand.

Likewise, a case for the usage record can be the same as that in the existing technology. The server can invoke a usage record corresponding to an identifier of each security question to determine the usage record of the security question.

In addition, as described in step S101, the generation time and the usage record of the security question are not necessarily determined by using the generation time and the usage record of the identifier of the security question in the present application, and the server can determine the generation time and the usage record of the security question based on a log of the security question.

S803: Determine at least one of a validity period, a priority, and a cooldown period that correspond to each security question based on the generation time and the usage record that correspond to each security question.

In this implementation of the present application, each security question of the account can correspond to at least one of a validity period, a cooldown period, and a priority, and the validity period, the cooldown period, and the priority can all be determined by using a generation time and a usage record of the security question. Therefore, the server can determine the at least one of the validity period, the cooldown period, and the priority of each security question based on the generation time and the usage record of each security question that are determined in step S802.

Specifically, the server determines a priority of each security question at a current time based on duration from a generation time of the security question to the current time. The priority initially set for the security question decreases as the duration from the generation time of the security question to the current time increases, until the priority is reduced to a predetermined basic priority.

Based on a usage record corresponding to each security question, each time the usage record corresponding to the security question is generated, the server can determine that the security question is used once, and can prolong a validity period corresponding to the security question once.

Based on a usage record corresponding to each security question, each time the usage record corresponding to the security question is generated, the server can determine that the security question is used once, and can set a cooldown period for the security question.

In other words, the server can determine each use status of the security question by using the usage record corresponding to the security question. In addition, during the use of the security question, the server can prolong the validity period corresponding to the security question, and set the cooldown period for the security question.

In addition to setting the cooldown period, as described in the identity verification process in FIG. 7, the server can reduce a priority of each security question based on a usage record of the security question. For example, when the priority of the selected security question is not a basic priority, after the server reduces the priority of the security question, the priority of the security question can be gradually restored as time passes by, until the priority is reduced to a priority corresponding to the security question when the security question is selected. Or, when the priority of the selected security question is the basic priority, after the server reduces the priority of the security question, the priority of the security question can be gradually restored to the basic priority as time passes by.

Certainly, if an identifier of each security question corresponding to the account also corresponds to a validity period, a cooldown period, and a priority, and is used to identify the validity period, the cooldown period, and the priority of the security question, the server can further determine at least one of the validity period, the cooldown period, and the priority of the identifier of the security question, and determine the validity period, the cooldown period, and the priority of the security question on this basis. Implementations are not limited in the present application.

S804: When identity verification is being performed on the account, select, based on the at least one of the validity period, the cooldown period, and the priority that correspond to each security question, a security question used for identity verification from the security questions corresponding to the account, to perform identity verification on the account.

In the present application, when the server determines to perform identity verification on the account, the server can select, based on the at least one of the validity period, the cooldown period, and the priority that correspond to each security question, the security question used for identity verification from the security questions corresponding to the account by using at least one of the following methods: determining a security question that is in a validity period at a current time based on validity periods corresponding to the security questions; and/or determining a security question that is not in a cooldown period at the current time based on cooldown periods corresponding to the security questions; and/or selecting, based on the priority corresponding to each security question, a security question by using a method that determines a probability of selecting the security question based on a priority corresponding to the security question at the current time, for example, a probability of selecting the security question increases with a priority corresponding to the security question at the current time; and performing identity verification on the account by using the security question.

For a specific process, references can be made to the identity verification process shown in FIG. 8. Details are omitted in the present application for simplicity.

In addition, in this implementation of the present application, when the server determines that any security question is not in a validity period at a current time (or an identifier of any security question is not in a validity period at a current time), the server can further delete the security question, to release storage space. In addition, the server can also delete a generation time and a usage record of the security question.

In addition, in many cases, the identity verification method can be used to verify whether the to-be-verified account has permission to continue to execute a service. Therefore, identity verification is performed on an account for performing a payment operation in step S804 in the present application. Technologies involved for the payment in this implementation of the present application can include Near Field Communication (NFC), Wi-Fi, 3G/4G/5G, a POS card reading technology, a QR code scanning technology, a barcode scanning technology, Bluetooth, an infrared technology, short message service (SMS), multimedia message service (MMS), etc.

Figure 11:
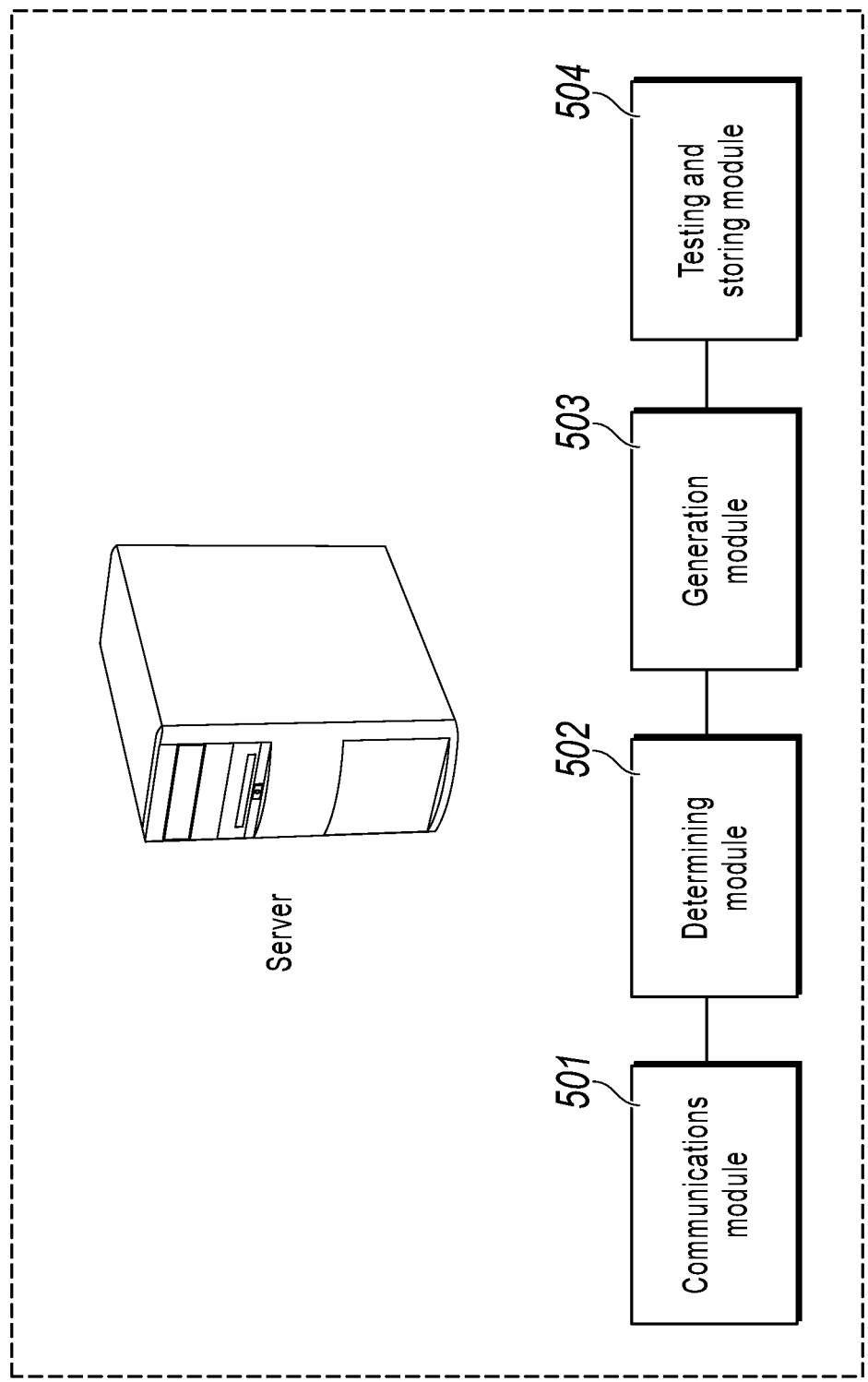
FIG. 11 is a schematic structural diagram illustrating a device for generating security questions, according to an implementation of the present application.

Based on the security question generation process shown in FIG. 1, an implementation of the present application further provides a device for generating security questions, as shown in FIG. 11.

FIG. 11 is a schematic structural diagram illustrating a device for generating security questions, according to an implementation of the present application. The device includes the following: a communications module 501, configured to send a security question generation instruction to a user device, and receive a reference picture generated and returned by the user device based on the generation instruction; a determining module 502, configured to determine several confusion pictures corresponding to the reference picture; and a generation module 503, configured to generate a security question based on the reference picture and the confusion pictures.

The generation module 503 determines that the reference picture satisfies a predetermined condition before generating the security question, where the predetermined condition includes at least one of the following: the number of pixels of the reference picture is not less than the predetermined number of pixels; storage occupation space of the reference picture is not smaller than predetermined storage occupation space; and a content category of the reference picture does not belong to a predetermined category.

The determining module 502 determines a feature value of the reference picture, and determines the several confusion pictures corresponding to the reference picture based on the feature value of the reference picture.

The determining module 502 determines the feature value of the reference picture based on a predetermined feature extraction model, where the feature extraction model includes at least one of a color feature model, a graphics feature model, and a complexity feature model, and the feature value includes at least one of a color feature value, a shape feature value, and a complexity feature value.

The determining module 502 determines a value range corresponding to a feature value of the confusion picture based on the feature value of the reference picture and a predetermined value setting policy; and determines, from a stored to-be-selected picture pool based on the value range, to-be-selected pictures whose feature values fall within the value range, and uses the to-be-selected pictures as the confusion pictures corresponding to the reference picture.

A difference between a maximum value of the value range and the feature value of the reference picture is not greater than a predetermined maximum value, a difference between a minimum value of the value range and the feature value of the reference picture is not less than a predetermined minimum value, and the feature value does not fall within the value range.

The generation module 503 determines the specified number of confusion pictures from the confusion pictures, and uses the reference picture and the determined confusion pictures as answer options, to generate the security question.

Before generating the security question, the generation module 503 blurs the reference picture, and uses a picture obtained after the blurring as a copy of the reference picture; and sends an instruction for deleting the reference picture to the user device, and locally stores the reference picture and the copy of the reference picture.

The generation module 503 determines the specified number of confusion pictures from the confusion pictures, and uses the copy of the reference picture and the determined confusion pictures as answer options, to generate the security question.

The device further includes the following: a testing and storing module 504, configured to receive an answer to the security question that is returned by the user device; and determine to store the security question when the answer to the security question that is returned by the user device matches the reference picture; or delete the security question when the answer to the security question that is returned by the user device does not match the reference picture.

The testing and storing module 504 sends query information about whether to store the security question to the user device; and stores the security question when the user device returns information indicating that the security question is to be stored; or deletes the security question when the user device returns information indicating that the security question is not to be stored.

The communications module 501 sends the security question generation instruction and several to-be-selected pictures to the user device, receives a picture selected from the several to-be-selected pictures and returned by the user device based on the generation instruction, and uses the picture as the reference picture.

The device for generating security questions shown in FIG. 11 can be located on a server. The server can be one device, or can be a system including a plurality of devices, namely, a distributed server.

Figure 12:
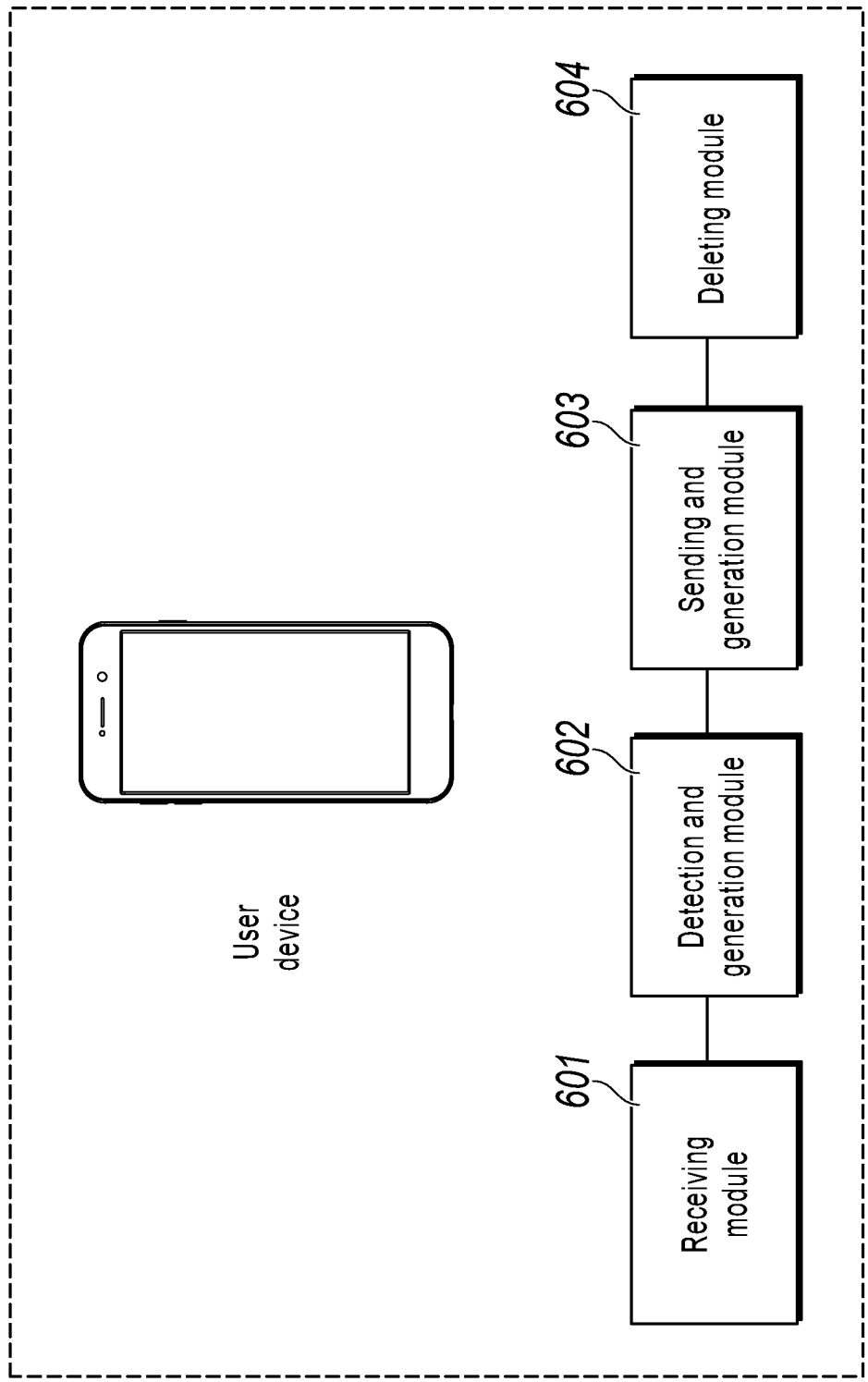
FIG. 12 is a schematic structural diagram illustrating another device for generating security questions, according to an implementation of the present application.

Based on the security question generation process shown in FIG. 6, an implementation of the present application further provides a device for generating security questions, as shown in FIG. 12.

FIG. 12 is a schematic structural diagram illustrating another device for generating security questions, according to an implementation of the present application. The device includes the following: a receiving module 601, configured to receive a security question generation instruction sent by a server; a detection and generation module 602, configured to detect an operation of a user, and generate a reference picture based on the detected operation; and a sending and generation module 603, configured to return the reference picture to the server, so that the server generates a security question based on the reference picture.

The detection and generation module 603 detects a gesture operation of the user in a specified area, and uses a picture generated by the gesture operation as the generated reference picture; or detects the operation of the user, and uses a picture collected by a sensor as the generated reference picture.

The device further includes the following: a deleting module 604, configured to receive an instruction for deleting the reference picture that is sent by the server; and delete the locally stored reference picture based on the instruction for deleting the reference picture.

The device for generating security questions shown in FIG. 12 can be located on a user device, and the user device can be a mobile phone, a tablet, etc.

Figure 13:
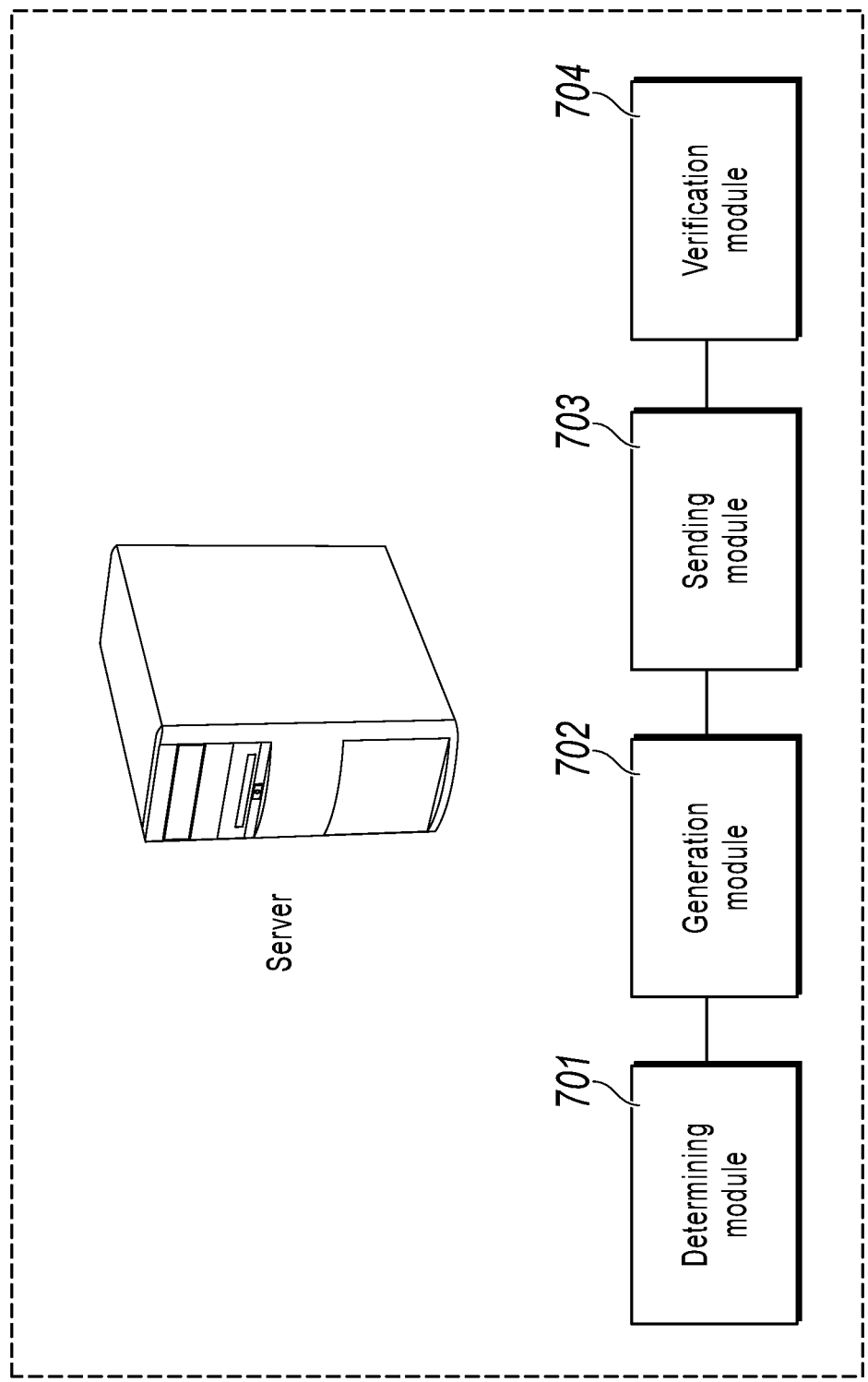
FIG. 13 is a schematic structural diagram illustrating a device for verifying identities, according to an implementation of the present application.

Based on the identity verification process shown in FIG. 9, an implementation of the present application further provides a device for verifying identities, as shown in FIG. 13.

FIG. 13 is a schematic structural diagram illustrating a device for verifying identities, according to an implementation of the present application. The device includes the following: a determining module 701, configured to determine, based on a to-be-verified account, a reference picture used to generate a security question corresponding to the to-be-verified account; a generation module 702, configured to generate the security question based on the reference picture and confusion pictures corresponding to the reference picture; a sending module 703, configured to send the security question to a user device that the to-be-verified account is logged in; and a verification module 704, configured to receive a selection result returned by the user device, and perform identity verification on the to-be-verified account based on the selection result.

The to-be-verified account corresponds to a plurality of security questions. Before determining the reference picture used to generate the security question corresponding to the to-be-verified account, the determining module 701 selects, from identifiers of the security questions corresponding to the to-be-verified account, an identifier of the security question generated based on the reference picture.

The determining module 701 selects the identifier of the security question generated based on the reference picture by using at least one of the following methods: selecting an identifier of a security question that is in a validity period at a current time based on validity periods corresponding to the identifiers of the security questions; selecting an identifier of a security question that is not in a cooldown period at the current time based on cooldown periods corresponding to the identifiers of the security questions; and selecting an identifier of a security question based on priorities corresponding to the identifiers of the security questions.

After selecting the identifier of the security question that is in the validity period at the current time, the determining module 701 prolongs a validity period corresponding to the selected identifier of the security question.

After selecting the identifier of the security question that is not in the cooldown period at the current time, the determining module 701 sets a cooldown period corresponding to the selected identifier of the security question.

After selecting the identifier of the security question, the determining module 701 reduces a priority corresponding to the selected identifier of the security question.

A priority initially set for the identifier of the security question decreases as duration from a generation time of the identifier of the security question to the current time increases, until the priority is reduced to a predetermined basic priority.

The determining module 701 selects an identifier of a security question by using a method that for an identifier of each security question, a probability of selecting the identifier of the security question increases with a priority corresponding to the identifier of the security question at the current time.

The verification module 704 receives the selection result returned by the user device; determines whether the selection result matches the reference picture; and if yes, determines that the identity verification on the to-be-verified account succeeds; or if no, determines that the identity verification on the to-be-verified account fails.

The to-be-verified account is an account for performing a payment operation. The verification module 704 performs identity verification on the to-be-verified account based on the selection result; and performs the payment operation when the identity verification succeeds; or rejects the payment operation when the identity verification fails.

The device for verifying identities shown in FIG. 13 can be located on a server. The server can be one device, or can be a system including a plurality of devices, namely, a distributed server.

When the device for verifying identities provided in this implementation of the present application is configured to perform identity verification on an account for performing a payment operation, technologies involved for the payment in this implementation of the present application can include Near Field Communication (NFC), Wi-Fi, 3G/4G/5G, a POS card reading technology, a QR code scanning technology, a barcode scanning technology, Bluetooth, an infrared technology, short message service (SMS), multimedia message service (MMS), etc.

Figure 14:
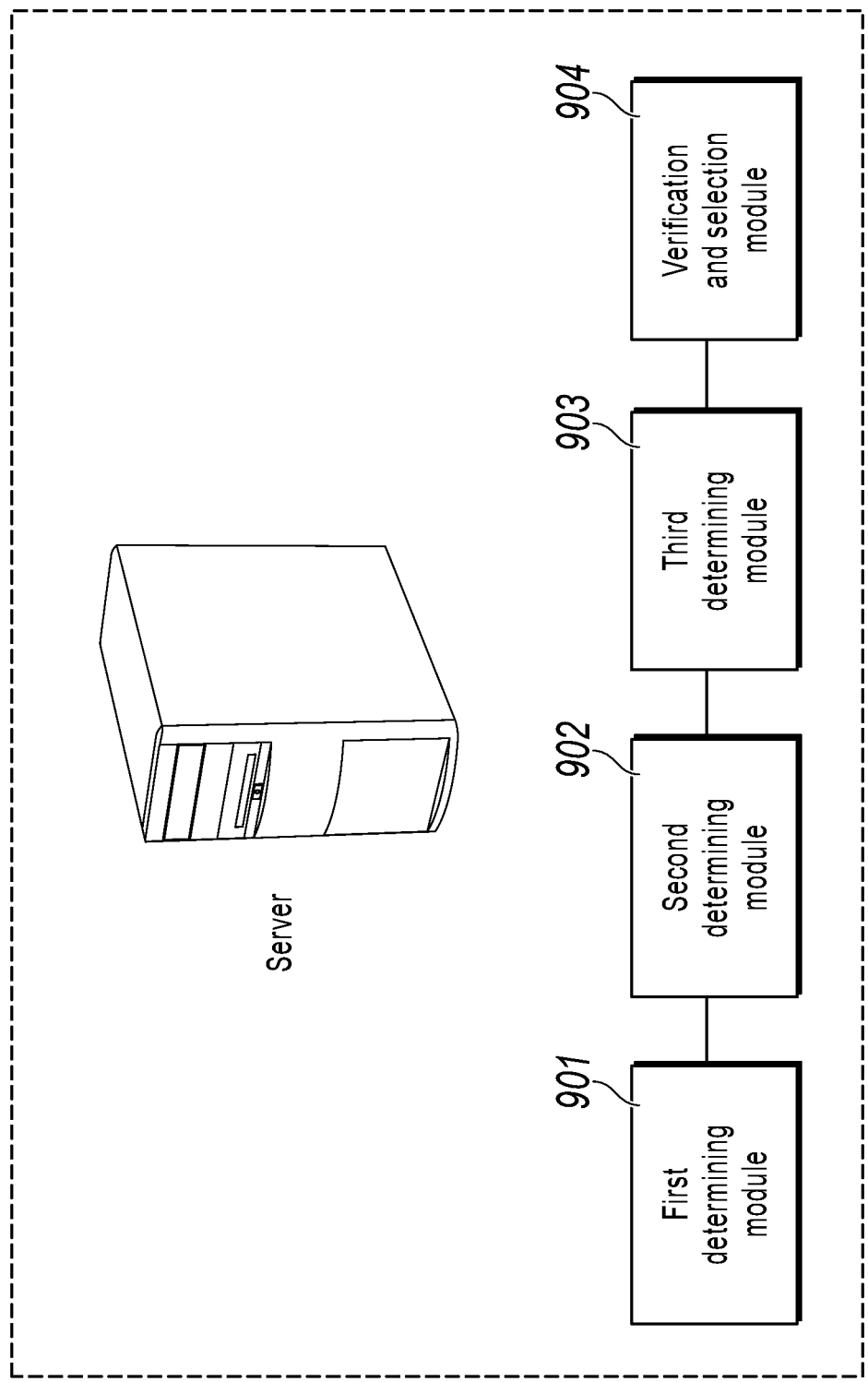
FIG. 14 is a schematic structural diagram illustrating a device for managing security questions, according to an implementation of the present application.

Based on the method for managing security questions shown in FIG. 9, an implementation of the present application further provides a device for managing security questions, as shown in FIG. 14.

FIG. 14 is a schematic structural diagram illustrating a device for managing security questions, according to an implementation of the present application. The device includes the following: a first determining module 901, configured to determine each security question corresponding to an account; a second determining module 902, configured to determine a generation time and a usage record that correspond to each security question; a third determining module 903, configured to determine at least one of a validity period, a priority, and a cooldown period that correspond to each security question based on the generation time and the usage record that correspond to each security question; and a verification and selection module 904, configured to: when performing identity verification on the account, select, based on the at least one of the validity period, the cooldown period, and the priority that correspond to each security question, a security question used for identity verification from the security questions corresponding to the account, to perform identity verification on the account.

The third determining module 903 determines a priority of each security question at a current time based on duration from a generation time of the security question to the current time, where the priority of the security question decreases as the duration from the generation time of the security question to the current time increases, until the priority is reduced to a predetermined basic priority.

The third determining module 903 prolongs, based on a usage record corresponding to each security question, a validity period corresponding to the security question once each time the security question is used.

The third determining module 903 sets, based on a usage record corresponding to each security question, a cooldown period for the security question each time the security question is used.

The verification and selection module 904 selects, based on the validity period, the priority, and the cooldown period that correspond to each security question corresponding to the account, the security question used for identity verification from the security questions corresponding to the account by using at least one of the following methods:

determining a security question that is in a validity period at a current time based on validity periods corresponding to the security questions; determining a security question that is not in a cooldown period at the current time based on cooldown periods corresponding to the security questions; and selecting, based on the priority corresponding to each security question, a security question by using a method that determines a probability of selecting the security question based on a priority corresponding to the security question at the current time, for example, a probability of selecting the security question increases with a priority corresponding to the security question at the current time.

When determining that the security question is not in a validity period, the verification and selection module 904 deletes the security question.

The device for managing security questions in FIG. 14 can be located on a server. The server can be one device, or can be a system including a plurality of devices, namely, a distributed server.

In addition, when the verification and selection module 904 provided in this implementation of the present application is configured to perform identity verification on an account for performing a payment operation, technologies involved for the payment in this implementation of the present application can include Near Field Communication (NFC), Wi-Fi, 3G/4G/5G, a POS card reading technology, a QR code scanning technology, a barcode scanning technology, Bluetooth, an infrared technology, short message service (SMS), multimedia message service (MMS), etc.

In the 1990s, whether a technical improvement is a hardware improvement (e.g., an improvement to a circuit structure, such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (e.g., a field programmable gate array (FPGA)) is such an integrated circuit, and a logical function of the PLD is determined by a user through device programming. The designer performs programming to "integrate" a digital system into a PLD without requesting a chip manufacturer to design and produce an application-specific integrated circuit chip. In addition, at present, instead of manually manufacturing an integrated circuit chip, such programming is mostly implemented by using "logic compiler" software. The logic compiler software is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be a microprocessor or a processor, or a computer-readable medium that stores computer readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicon Labs C8051F320. The memory controller can also be implemented as a part of the control logic of the memory. A person skilled in the art also knows that, in addition to implementing the controller by using the computer readable program code, logic programming can be performed on method steps to allow the controller to implement the same function in forms of the logic gate, the switch, the application-specific integrated circuit, the programmable logic controller, and the built-in microcontroller. Therefore, the controller can be considered as a hardware component, and a device configured to implement various functions in the controller can also be considered as a structure in the hardware component. Or the device configured to implement various functions can even be considered as both a software module implementing the method and a structure in the hardware component.

The system, device, module, or unit illustrated in the previous implementations can be implemented by using a computer chip or an entity, or can be implemented by using a product having a certain function. A typical implementation device is a computer. The computer can be, for example, a personal computer, a laptop computer, a cellular phone, a camera phone, a smartphone, a personal digital assistant, a media player, a navigation device, an email device, a game console, a tablet, or a wearable device, or any combination of these devices.

For ease of description, the device above is described by dividing functions into various units. Certainly, when the present application is implemented, a function of each unit can be implemented in one or more pieces of software and/or hardware.

A person skilled in the art should understand that an implementation of the present disclosure can be provided as a method, a system, or a computer program product. Therefore, the present disclosure can use a form of hardware only implementations, software only implementations, or implementations with a combination of software and hardware. Moreover, the present disclosure can use a form of a computer program product that is implemented on one or more computer-usable storage media (including but not limited to a disk memory, a CD-ROM, an optical memory, etc.) that include computer-usable program code.

The present disclosure is described with reference to the flowcharts and/or block diagrams of the method, the device (system), and the computer program product based on the implementations of the present disclosure. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so that the instructions executed by the computer or the processor of the another programmable data processing device generate a device for implementing a specific function in one or more processes in the flowcharts and/or in one or more blocks in the block diagrams.

These computer program instructions can be stored in a computer readable memory that can instruct the computer or the another programmable data processing device to work in a specific way, so that the instructions stored in the computer readable memory generate an artifact that includes an instruction device. The instruction device implements a specific function in one or more processes in the flowcharts and/or in one or more blocks in the block diagrams.

These computer program instructions can be loaded onto the computer or another programmable data processing device, so that a series of operations and operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more processors, one or more input/output interfaces, one or more network interface, and one or more memories.

The memory can include a non-persistent memory, a random access memory (RAM), a non-volatile memory, and/or another form that are in a computer readable medium, for example, a read-only memory (ROM) or a flash memory. The memory is an example of the computer readable medium.

The computer readable medium includes persistent, non-persistent, movable, and unmovable media that can store information by using any method or technology. The information can be a computer readable instruction, a data structure, a program module, or other data. Examples of a computer storage medium include but are not limited to a phase-change random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, or a magnetic tape/magnetic disk storage or another magnetic storage device or any other non-transmission medium. The computer storage medium can be used to store information accessible by the computing device. Based on the definition in the present specification, the computer readable medium does not include transitory computer readable media (transitory media) such as a modulated data signal and carrier.

It is worthwhile to further note that, the terms "include", "comprise", or any other variants thereof are intended to cover a non-exclusive inclusion, so a process, a method, a product, or a device that includes a list of elements not only includes those elements but also includes other elements which are not expressly listed, or further includes elements inherent to such a process, method, product, or device. Without more constraints, an element preceded by "includes a . . . " does not preclude the existence of additional identical elements in the process, method, product, or device that includes the element.

A person skilled in the art should understand that an implementation of the present application can be provided as a method, a system, or a computer program product. Therefore, the present application can use a form of hardware only implementations, software only implementations, or implementations with a combination of software and hardware. Moreover, the present application can use a form of a computer program product that is implemented on one or more computer-usable storage media (including but not limited to a disk memory, a CD-ROM, an optical memory, etc.) that include computer-usable program code.

The present application can be described in the general context of computer executable instructions executed by a computer, for example, a program module. Generally, the program module includes a routine, a program, an object, a component, a data structure, etc. executing a specific task or implementing a specific abstract data type. The present application can also be practiced in distributed computing environments. In the distributed computing environments, tasks are performed by remote processing devices connected through a communications network. In a distributed computing environment, the program module can be located in both local and remote computer storage media including storage devices.

The implementations in the present specification are described in a progressive way. For same or similar parts of the implementations, references can be made to the implementations. Each implementation focuses on a difference from other implementations. Particularly, a system implementation is basically similar to a method implementation, and therefore, is described briefly. For related parts, references can be made to related descriptions in the method implementation.

The previous implementations are implementations of the present application, and are not intended to limit the present application. A person skilled in the art can make various modifications and changes to the present application. Any modification, equivalent replacement, or improvement made without departing from the spirit and principle of the present application shall fall within the scope of the claims in the present application.

Figure 15:
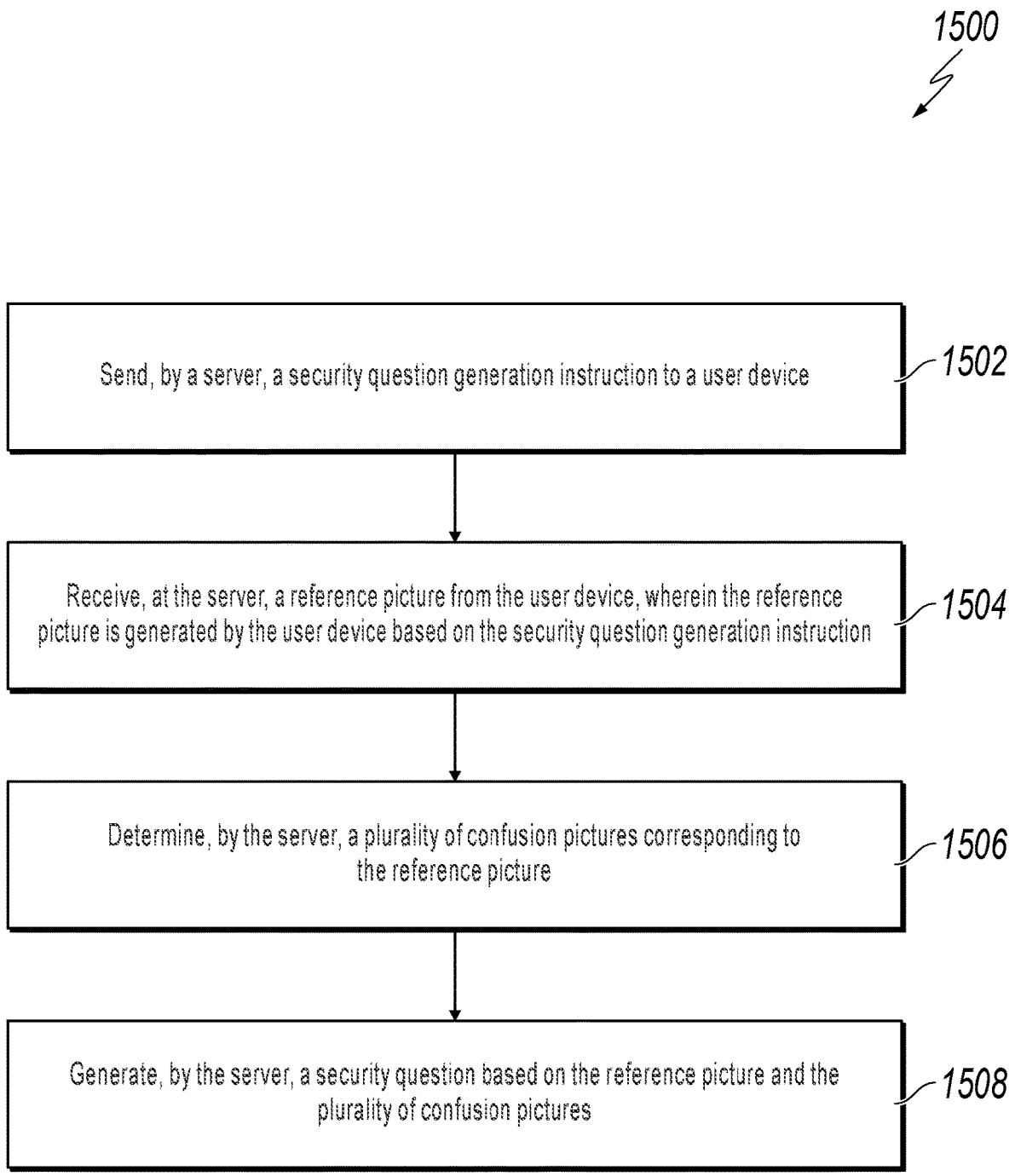
FIG. 15 is a flowchart illustrating an example of a computer-implemented method for generating security questions, according to an implementation of the present disclosure.

FIG. 15 is a flowchart illustrating an example of a computer-implemented method 1500 for generating security questions, according to an implementation of the present disclosure. For clarity of presentation, the description that follows generally describes method 1500 in the context of the other figures in this description. However, it will be understood that method 1500 can be performed, for example, by any system, environment, software, and hardware, or a combination of systems, environments, software, and hardware, as appropriate. In some implementations, various steps of method 1500 can be run in parallel, in combination, in loops, or in any order.

At 1502, a security question generation instruction is sent by a server to a user device. From 1502, method 1500 proceeds to 1504.

At 1504, a reference picture is received at the server from the user device, where the reference picture is generated by the user device based on the security question generation instruction. From 1504, method 1500 proceeds to 1506.

At 1506, a number of confusion pictures corresponding to the reference picture are determined by the server.

In some implementations, determining the number of confusion pictures includes determining a feature value of the reference picture, and determining the number of confusion pictures corresponding to the reference picture based on the feature value.

In some implementations, determining the number of confusion pictures further includes determining a value range corresponding to the reference picture based on a preconfigured value setting policy, and selecting, from a stored to-be-selected picture pool and, as the confusion pictures corresponding to the reference picture, a number of to-be-selected pictures, where a feature value associated with each of the number of to-be-selected pictures falls within the value range. From 1506, method 1500 proceeds to 1508.

At 1508, a security question is generated by the server based on the reference picture and the number of confusion pictures.

In some implementations, prior to generating the security question: a copy of the reference picture is generated by blurring the reference picture, an instruction for deleting the reference picture is sent to the user device; and the reference picture and the copy of the reference picture is locally stored.

In some implementations, method 1500 further includes, prior to generating the security question: determining whether the reference picture satisfies a predetermined condition, where the predetermined condition includes at least one of a number of pixels associated with the reference picture is not less than a predetermined number of pixels, a storage occupation space is not smaller than a predetermined storage occupation space, and a content category of the reference picture does not belong to a predetermined category.

In some implementations, method 1500 further includes, sending query information about whether to store the security question on the user device to the user device, receiving returned information corresponding to the query information from the user device, and determining whether to store the security question on the user device based on the returned information.

In some implementations, method 1500 further includes, sending the security question to the user device; receiving an answer to the security question from the user device, and determining whether to store the security question on the server. In such implementations, determining whether to store the security question includes: determining an identity verification result associated with the user device based on the answer to the security question, determining whether the identity verification result succeeds. If it is determined that the identity verification result succeeds, the security question is stored on the server. If it is determined that the identity verification result fails, the security question is deleted. After 1508, method 1500 can stop.

Implementations of the present application can solve technical challenges related to identity verification. Traditionally, a user identity can be verified by using a security question. There are two types of security questions based on different generation methods: 1) instructing a user to pre-determine security questions and answers and 2) collecting and analyzing historical behavior data of a user, which is used for identity verification. However, the traditional methods have a few disadvantages. For example, security questions generated in the first method, are typically questions infrequently used by the user, and there is a relatively high requirement on a memory of the user for a correct answer to the question. Although it may be difficult to obtain an answer to each of the security questions, a probability that the user forgets one or more correct answer to the questions is high, affecting usability of the security questions. For the second generation method, because the security question(s) need to be collected and analyzed based on historical behavior data of the user, a large amount of historical behavior data associated with the user usually needs to be collected for analysis and generation of the security question(s). If the amount of available/obtainable historical behavior data associated with the user is relatively small or zero, it is difficult to generate the security question(s). Therefore, for the security question(s) generated in the second method, there are requirements on both an amount and quality of historical behavior data associated with the user. Consequently, it is more difficult to generate the security question(s) by using the second method and to promote/expand an application scope for the second method. What is needed is a technique to bypass these challenges with respect to the traditional methods, to provide a more efficient identity verification solution that needs fewer security question generation requirements, and a technique with lower overall costs (such as, computer resources, network resources, personnel, and financial).

Implementation of the present application provide methods and apparatuses for identity verification based on generated questions. According to these implementations, during generation of a security question, a security question generation instruction is first sent to a user device, so that the user device detects and returns a reference picture generated under an operation of a user. Then, several confusion pictures corresponding to the reference picture are determined based on the reference picture. Finally, a security question is generated based on the reference picture and the confusion pictures, and identity verification is performed by using the security question when necessary.

It can be seen that because the reference picture can be generated anytime, a probability that other people can deliberately steal the reference picture is reduced. Further, because only the user knows specific content of the reference picture, it is difficult for other people to determine specific content of the reference picture even if they know particular life habits and personal information of the user. Therefore, the reference picture is relatively secure. Additionally, because the reference picture is generated by operation of the user, the user is more involved in setting the security question. Therefore, the user is familiar with the reference picture, the user can better remember the reference picture, and a probability that the user would forgets the reference picture is reduced. It can be seen that, a relatively secure security question that the user can easily remember can then be generated. In addition, during generation of the security question, historical behavior data of the user does not need to be collected and used. Therefore, usability of the security question is improved, overall costs are reduced, and identity verification efficiency is improved.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
identifying, by a server, an account to be verified by a security question;
sending, by the server, a security question generation instruction to a user device associated with the account;
receiving, at the server, a reference picture from the user device, wherein the reference picture is generated by the user device based on the security question generation instruction, the reference picture is one of: (i) a photograph captured by the user device, or (ii) a drawing generated by the user device based on user input;
determining, by the server, one or more feature values of the reference picture;
selecting, by the server from a pool of images and based on the one or more feature values, a plurality of confusion pictures corresponding to the reference picture, wherein corresponding one or more feature values for each of the confusion pictures are within corresponding ranges of the one or more feature values of the reference picture;
generating, by the server, a security question based on the reference picture and the plurality of confusion pictures, wherein the reference picture is a correct answer option and each of the confusion pictures is an incorrect answer option;
sending the security question comprising the reference picture and the confusion pictures the to the user device;
receiving, by the server, a selection result returned by the user device;
determining, by the server, that the selection result corresponds to the reference picture; and
in response to determining that the selection result corresponds to the reference picture, determining that a verification of the account has succeeded.

2. The computer-implemented method of claim 1, wherein selecting the plurality of confusion pictures comprises:
determining the ranges corresponding to each of the one or more feature values of the reference picture based on a preconfigured value setting policy; and
selecting the plurality of confusion pictures in accordance with the ranges.

3. The computer-implemented method of claim 1, wherein the one or more feature values are determined based on a predetermined feature extraction model, and wherein the predetermined feature extraction model comprises at least one of a color feature model, a graphics feature model, and a complexity feature model.

4. The computer-implemented method of claim 1, further comprising, prior to generating the security question:
generating a copy of the reference picture by blurring the reference picture;
sending an instruction for deleting the reference picture to the user device; and
locally storing the reference picture and the copy of the reference picture.

5. The computer-implemented method of claim 1, further comprising, prior to generating the security question:
determining whether the reference picture satisfies a predetermined condition, wherein the predetermined condition comprises at least one of a number of pixels associated with the reference picture is not less than a predetermined number of pixels, a storage occupation space is not smaller than a predetermined storage occupation space, and a content category of the reference picture does not belong to a predetermined category.

6. The computer-implemented method of claim 1, wherein generating the security question further comprises:
generating, by the server, an identifier of the security question;
storing, by the server, the security question, the identifier, and a correspondence between the security question and the identifier that allows the server to determine the security question based on the identifier.

7. A non-transitory, computer-readable medium storing one or more instructions executable by a computer system to perform operations comprising:
identifying, by a server, an account to be verified by a security question;
sending, by the server, a security question generation instruction to a user device associated with the account;
receiving, at the server, a reference picture from the userdevice, wherein the reference picture is generated by the user device based on the security question generation instruction, the reference picture is one of: (i) a photograph captured by the user device, or (ii) a drawing generated by the user device based on user input;
determining, by the server, one or more feature values of the reference picture;
selecting, by the server from a pool of images and based on the one or more feature values, a plurality of confusion pictures corresponding to the reference picture, wherein corresponding one or more feature values for each of the confusion pictures are within corresponding ranges of the one or more feature values of the reference picture; and
generating, by the server, a security question based on the reference picture and the plurality of confusion pictures , wherein the reference picture is a correct answer option and each of the confusion pictures is an incorrect answer option;
sending the security question comprising the reference picture and the confusion pictures the to the user device;
receiving, by the server, a selection result returned by the userdevice;
determining, by the server, that the selection result corresponds to the reference picture; and
in response to determining that the selection result corresponds to the reference picture, determining that a verification of the account has succeeded.

8. The non-transitory, computer-readable medium of claim 7, wherein selecting the plurality of confusion pictures comprises:
determining the value ranges corresponding to each of the one or more feature values of the reference picture based on a preconfigured value setting policy; and
selecting the plurality of confusion pictures in accordance with the ranges.

9. The non-transitory, computer-readable medium of claim 7, wherein the one or more feature values are determined based on a predetermined feature extraction model, and wherein the predetermined feature extraction model comprises at least one of a color feature model, a graphics feature model, and a complexity feature model.

10. The non-transitory, computer-readable medium of claim 7, further comprising, prior to generating the security question:

generating a copy of the reference picture by blurring the reference picture;

sending an instruction for deleting the reference picture to the user device; and locally storing the reference picture and the copy of the reference picture.

11. The non-transitory, computer-readable medium of claim 7, further comprising, prior to generating the security question:

determining whether the reference picture satisfies a predetermined condition, wherein the predetermined condition comprises at least one of a number of pixels associated with the reference picture is not less than a predetermined number of pixels, a storage occupation space is not smaller than a predetermined storage occupation space, and a content category of the reference picture does not belong to a predetermined category.

12. The non-transitory, computer-readable medium of claim 7, further comprising:

sending query information about whether to store the security question on the user device to the user device;

receiving returned information corresponding to the query information from the user device; and determining whether to store the security question on the user device based on the returned information.

13. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

identifying, by a server, an account to be verified by a security question;

sending, by the server, a security question generation instruction to a user device associated with the account;

receiving, at the server, a reference picture from the user device, wherein the reference picture is generated by the user device based on the security question generation instruction, the reference picture is one of: (i) a photograph captured by the user device, or (ii) a drawing generated by the user device based on user input;

determining, by the server, one or more feature values of the reference picture;

selecting, by the server from a pool of images and based on the one or more feature values, a plurality of confusion pictures corresponding to the reference picture, wherein corresponding one or more feature values for each of the confusion pictures are within corresponding ranges of the one or more feature values of the reference picture;

generating, by the server, a security question based on the reference picture and the plurality of confusion pictures, wherein the reference picture is a correct answer option and each of the confusion pictures is an incorrect answer option;

sending the security question comprising the reference picture and the confusion pictures the to the user device;

receiving, by the server, a selection result returned by the user device;

determining, by the server, that the selection result corresponds to the reference picture; and in response to determining that the selection result corresponds to the reference picture, determining that a verification of the account has succeeded.

14. The system of claim 13, wherein selecting the plurality of confusion pictures comprises:

determining the ranges corresponding to each of the one or more feature values of the reference picture based on a preconfigured value setting policy; and selecting the plurality of confusion pictures in accordance with the ranges.

15. The system of claim 14, wherein the one or more feature values are determined based on a predetermined feature extraction model, and wherein the predetermined feature extraction model comprises at least one of a color feature model, a graphics feature model, and a complexity feature model.

* * * * *

UNITED STATES PATENT AND TRADEMARK OFFICE
CERTIFICATE OF CORRECTION

PATENT NO. : 10,885,178 B2  Page 1 of 1
APPLICATION NO. : 16/422689
DATED : January 5, 2021
INVENTOR(S) : Liyun Dong et al.

It is certified that error appears in the above-identified patent and that said Letters Patent is hereby corrected as shown below:

In the Claims

Column 41, Line 30, in Claim 1, after "confusion pictures", delete "the".

Column 42, Line 21, in Claim 7, delete "userdevice," and insert -- user device, --, therefor.

Column 42, Lines 37-38, in Claim 7, delete "pictures ," and insert -- pictures, --, therefor.

Column 42, Line 42, in Claim 7, after "confusion pictures", delete "the".

Column 42, Line 45, in Claim 7, delete "userdevice;" and insert -- user device; --, therefor.

Column 42, Line 54, in Claim 8, after "determining the", delete "value".

Column 44, Line 20, in Claim 13, after "confusion pictures", delete "the".

Signed and Sealed this
Sixteenth Day of November, 2021

Drew Hirshfeld
*Performing the Functions and Duties of the*
*Under Secretary of Commerce for Intellectual Property and*
*Director of the United States Patent and Trademark Office*